US012783916B2

(12) United States Patent
Lafond et al.

(10) Patent No.: US 12,783,916 B2
(45) Date of Patent: Nov. 3, 2026

(54) METHOD OF AND SYSTEM FOR ONLINE MACHINE LEARNING WITH DYNAMIC MODEL EVALUATION AND SELECTION

(71) Applicant: THALES CANADA INC., Ottawa (CA)

(72) Inventors: Daniel Lafond, Montreal (CA); Frédéric Morin, Montreal (CA); Bénédicte Chatelais, Montreal (CA)

(73) Assignee: THALES CANADA INC., Ottawa (CA)

( * ) Notice: Subject to any disclaimer, the term of this patent is extended or adjusted under 35 U.S.C. 154(b) by 1141 days.

(21) Appl. No.: 17/385,285

(22) Filed: Jul. 26, 2021

(65) Prior Publication Data

US 2022/0027764 A1 Jan. 27, 2022

Related U.S. Application Data

(60) Provisional application No. 63/056,978, filed on Jul. 27, 2020.

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC ................................ G06N 5/04; G06N 20/00
See application file for complete search history.

(56) References Cited

U.S. PATENT DOCUMENTS

2015/0278706 A1* 10/2015 Shivashankar ........ G06N 20/00 706/12
2018/0039731 A1* 2/2018 Szeto ..................... G16H 40/20
2018/0240031 A1 8/2018 Huszar et al.
2020/0250527 A1* 8/2020 Zhao ...................... G06N 3/047
2021/0365965 A1* 11/2021 Shrivastava ....... G06Q 30/0201
(Continued)

OTHER PUBLICATIONS

Parikh et.al, Implementing Machine Learning for the Offline Web with TensorFlow.js, Feb. 22, 2019 (Year: 2019).*
(Continued)

*Primary Examiner* — Alexey Shmatov
*Assistant Examiner* — Duy T Diep
(74) *Attorney, Agent, or Firm* — Studebaker Brackett PLLC

(57) ABSTRACT

There is provided a method and system for providing a recommendation for a given problem by using a set of supervised machine learning (ML) models online by performing dynamic model evaluation and selection. An optional knowledge capture phase may be used to train the set of ML models offline using passive and/or active learning. Upon detection of a suitable initialization condition, the set of ML models is provided for inference and a feature vector is obtained. A set of predictions associated with accuracy metrics is generated by the set of models based on the feature vector. The accuracy metric may be global or class-specific. A recommendation is provided based on at least one of the set of predictions. The recommendation may be provided by selecting a best model, or by performing a vote weighted by the accuracy metrics. The set of ML models is retrained after obtaining an actual prediction.

19 Claims, 9 Drawing Sheets

(56) References Cited

U.S. PATENT DOCUMENTS

2023/0148321 A1* 5/2023 Hall .................... G16H 50/20 706/12
2023/0169751 A1* 6/2023 Geurts .................. B07C 5/342 382/159

OTHER PUBLICATIONS

Yang et.al, "Improving Model Inference in Industry by Combining Active and Passive learning", Mar. 18, 2019 (Year: 2019).*
Oscar et.al, "Query By Committee and Challenges in Batch Learning", Apr. 1, 2015 (Year: 2015).*
MacDonald et.al, "When does passive learning improve the effectiveness of active learning?", Aug. 2016 (Year: 2016).*
Hanneke et.al, "Activized Learning: Transforming Passive to Active with Improved Label Complexity", May 12, 2012 (Year: 2012).*
Cooksey, R. W. (1996). Judgment analysis: Theory, methods, and applications. San Diego, CA: Academic Press.
Meehl, P. E. (1954). Clinical versus statistical prediction: A theoretical analysis and a review of the evidence. Minneapolis: University of Minnesota Press.
Chatelais Benedicte et al., "Improving Policy-Capturing with Active Learning for Real-Time Decision Support," Feb. 19, 2020, pp. 177-182, XP055910638, Retrieved from the Internet w/ URL: https://pdf.zlibcdn.com/dtoken/b711055736fb5a59278ec59768004a2f/Intelligent_Human_Systems_Integration_2020_Procee_(z-lib.org).pdf.
EPO Search Report dated Apr. 28, 2022 for corresponding case EP 21187645.3. (pp. 1-12).
Aiman-Smith, L, Scullen, S. E., & Barr, S. H. (2002). Conducting studies of decision-making in organizational contexts: A tutorial for policy-capturing and other regression-based techniques. Organizational Research Methods, 5, 388-414. doi:10.1177/109442802237117.
Armstrong, J. S. (2001 ). Judgmental bootstrapping: Inferring experts' rules for forecasting. In J. S. Armstrong (Ed.), Principles of forecasting: A handbook for researchers and practitioners (pp. 171-192). Norwood, MA: Kluwer.
Brehmer, A., & Brehmer, B. (1988). What have we learned about human judgment from thirty years of policy capturing? In B. Brehmer & C.R. B. Joyce (Eds.), Human judgment: The SJT view (pp. 75-114). Amsterdam, Netherlands: North Holland.
Cropp, N., Banks, A., & Elghali, L. (2011 }. Expert decision-making in a complex engineering environment: A comparison of the lens model, explanatory coherence, and matching heuristics. Journal of Cognitive Engineering and Decision Making, 5, 255-276.
Dhami, M. K. (2003). Psychological models of professional decision-making. Psychological Science, 14, 175-180. doi:10.1111/1467-9280.01438.
Ebert, R. J., & Kruse, T. E. (1978). Bootstrapping the security analyst. Journal of Applied Psychology, 63, 110-119.
Hoffman, P. J. (1960). The paramorphic representation of clinical judgment. Psychological Bulletin, 57, 116-131. http//dx.doi. org/10.1037/h00478D7.
Karelaia, N., Hogarth, R.M. (2008). Determinants of linear judgment: a meta-analysis of lens model studies. Psychological Bulletin, 134, 404-426.
Karren, R. J , & Barringer, M. W. (2002). A review and analysis of the policy-capturing methodology in organizational research: Guidelines for research and practice. Organizational Research Methods, 5, 337-361. doi 10.1177/109442802237115.
Lafond, D., Champagne, J., Hervet, G., Gagnon, J.-F., Tremblay, S., & Rousseau, R. (2009). Decision analysis using policy capturing and process tracing techniques in a simulated naval air-defense task. In Proceedings of the Human Factors and Ergonomics Society 53rd Annual Meeting (pp. 1220-1224) Santa Monica, CA: Human Factors and Ergonomics Society.
Lafond, D., Labonte, K., Hunter, A., Neyedli, H.F., & Tremblay, S. (2019). Judgment Analysis for RealTime Decision Support Using the Cognitive Shadow Policy-Capturing System. In International Conference on Human Interaction and Emerging Technologies (pp. 78-83). Springer, Cham.
Lafond, D., Roberge-Vallieres, B., Vachon, & Tremblay, S. (2017). Judgment analysis in a dynamic multi-task environment: Capturing non-linear policies using decision trees. Journal of Cognitive Engineering and Decision Making, 11, 122-135.
Ohly, S (2019) , "Characteristics of challenging situations: two policy-capturing studies", Journal of Managerial Psychology, vol. 34 No. 3, pp. 170-183. https://doi.org/10.1108/JMP-06-2018-0232.
Rogers, Z. S , Carter, C. R, & Kwan, V. (2019) Making tough choices A policy capturing approach to evaluating the tradeoffs in sustainable supplier development initiatives. Journal of Purchasing and Supply Management, 25(5), 100574.
Rothrock, L., & Kirlik, A. (2003). Inferring rule-based strategies in dynamic judgment tasks: Toward a non-compensatory formulation of the lens model. IEEE Transactions on Systems, Man, and Cybernetics-Part A: Systems and Humans, 33, 58-72. doi:10.1109/TSMCA.2003.812601.
Wiggins, N., & Kohen, E. (1971 ). Man vs. model of man revisited: The forecasting of graduate school success. Journal of Personality and Social Psychology, 19, 100-106. http://dx.doi.org/10.1037/0003-066X.34.7.571.

* cited by examiner

400

600

800

METHOD OF AND SYSTEM FOR ONLINE MACHINE LEARNING WITH DYNAMIC MODEL EVALUATION AND SELECTION

CROSS-REFERENCE

The present application claims priority to U.S. Provisional Patent Application Ser. No. 63/056,978 filed on Jul. 27, 2020 the entirety of which is incorporated herein by reference.

FIELD

The present technology relates to machine learning algorithms (MLAs) in general and more specifically to methods and systems for providing recommendations using a set of machine learning models online with dynamic model evaluation and selection, which may be applied in the context of policy capturing.

BACKGROUND

Improvements in computer hardware and technology coupled with the multiplication of connected mobile electronic devices have spiked interest in developing solutions for task automatization, outcome prediction, information classification and learning from experience, resulting in the field of machine learning. Machine learning, closely related to data mining, computational statistics and optimization, explores the study and construction of algorithms that can learn from and make predictions on data.

The field of machine learning has evolved extensively in the last decade, giving rise to self-driving cars, speech recognition, image recognition, personalization, and understanding of the human genome. In addition, machine learning enhances different information retrieval activities, such as document searching, collaborative filtering, sentiment analysis, and so forth.

Machine learning algorithms (MLAs) may generally be divided into broad categories such as supervised learning, unsupervised learning and reinforcement learning. Supervised learning consists of presenting a machine learning algorithm with training data consisting of inputs and outputs labelled by assessors, where the goal is to train the machine learning algorithm such that it learns a general rule for mapping inputs to outputs. Unsupervised learning consists of presenting the machine learning algorithm with unlabeled data, where the goal is for the machine learning algorithm to find a structure or hidden patterns in the data. Reinforcement learning consists of having an algorithm evolving in a dynamic environment without providing the algorithm with labeled data or corrections.

Policy capturing is a judgment analysis method relying on statistical or machine learning techniques to understand and predict human decisions. This methodology allows inferring a decision model based on a list of observed decisions (a target behavior or judgment) and a set of predictors (features or variables) associated to each decision. For example, policy capturing has been used to infer clinical decisions based on patient attributes and symptoms and has been applied in various other domains such as education, finance, judicial decision making, personnel selection/training, and environmental risk management.

Policy capturing constitutes an alternative to classic approaches requiring the verbal elicitation of human knowledge to manually generate complex if-then rule sets (expert systems). Indeed, a known limitation of verbal protocol analysis is that human experts may not be fully able to verbally express their knowledge, partly in the case of implicit/procedural knowledge. Linear regression models (logistic regression when the output is a category) have dominated this approach and were found in a meta-analysis to provide decision models that are on average 10% more accurate than individual experts (Karelaia & Hogarth, 2008). While the strength of linear models is their robustness to noise, more flexible machine learning models were found to be superior in a task domain involving nonlinearly separable categories (Lafond, Roberge-Vallieres, Vachon, & Tremblay, 2017).

Another important finding is that no single model appears to be always best across decision makers and across tasks. This result is attributable to the well-known "no free lunch" theorem stating that given the full range of possible classification problems, the distinct bias of different inference models will necessarily be favorable for some problems and unfavorable for others. The performance benefit of policy capturing is called the "judgmental bootstrapping" effect, which can be observed when modeling groups of experts or individuals. This effect speaks to the notion that models tend to capture the regularities in a decision pattern without replicating a minority of idiosyncratic decisions (likely errors due to fatigue, stress, distraction, mental overload, and so on)

Active learning, also known as query learning or optimal experimental design, is based on the hypothesis that if a machine learning algorithm is allowed to query a user or an information source to label new data points with desired outputs, the learning algorithm may perform better with less training.

In certain situations, unlabeled data may be abundant, but manual labeling by human assessors may be difficult, time consuming and expensive.

SUMMARY

It is an object of the present technology to ameliorate at least some of the inconveniences present in the prior art. One or more embodiments of the present technology may provide and/or broaden the scope of approaches to and/or methods of achieving the aims and objects of the present technology.

Developers of the present technology have appreciated that one technical problem when working with supervised learning methods concerns the annotation of data necessary for training models, which is time-consuming and expensive, leading to limited amounts of labeled instances in a database. Supervised learning methods require labeled data to efficiently train models. Labeled data must have two characteristics: quality and quantity.

More specifically, a useful training dataset requires data exemplars to be representative enough of the problem of interest to allow discriminating the different response categories. However, the annotation of data, especially in expert domains, is generally done manually. It raises two major technical problems, labeling is both: time-consuming and costly.

The above issues generally lead to having a limited volume of training examples. Indeed, one cannot annotate instance from every possible situation related to one problem of interest. A good training dataset must be representative of the problem to allow model(s) to learn from those data and infer general rules.

Further, recommendation systems and decision support systems are expected to be personalized to individuals or groups problems (decision making or judgment tasks) and efficient in an operational context as soon as possible.

In order to address the aforementioned points, one or more embodiments of the present technology are designed as an automatic and multi-model machine learning system. It allows the system to adapt online to countless classifications tasks without a-priori need to determine which type of learning algorithm is most useful for either the defined modeling problem, or even for different individual human decision patterns.

One or more embodiments of the present technology enable capturing human decision policies with minimal labeled examples without reducing prediction accuracy of models, reducing annotation cost significantly (in terms of time saving and economic impact) and increasing the accuracy of the system for a same duration of knowledge capture compared to a passive selection of examples.

The present technology enables automatically and incrementally improving the sample selection process based on new knowledge gained by learning after each successive example and building a balanced and representative training dataset to improve a model's prediction. In some instances, when data is available or it is deemed necessary, the system can first learn the user's decision pattern during a knowledge capture phase prior to the actual use for online decision support (and continued online learning).

Thus, one or more embodiments of the present technology are directed to a method of and a system for online machine learning with dynamic model evaluation and selection.

In accordance with a broad aspect of the present technology, there is provided a method for providing a recommendation for a given problem by using a set of machine learning models online, the given problem being associated with a set of features, the method being executed by a processing device. The method comprises: initializing, using the set of features associated with the given problem, a set of supervised machine learning algorithms, upon detection of a suitable initialization condition: providing, by the set of supervised machine learning algorithms, the set of machine learning models for online inference, obtaining a feature vector for the given problem,

- generating, by the set of machine learning models, using the feature vector, a set of predictions, each respective prediction being associated with a respective accuracy metric,
- providing, based on at least one of the set of predictions associated with the respective accuracy metrics, the recommendation for the given problem, the recommendation being associated with a first prediction having been generated by at least one of the set of machine learning models,
- obtaining an actual decision associated with the feature vector for the given problem, and training, by the set of supervised machine learning algorithms, the set of machine learning models using the feature vector and the actual decision as a label.

In one or more embodiments of the method, said initializing of, using the set of features associated with the given problem, the set of supervised machine learning algorithms is performed offline.

In one or more embodiments of the method, the method further comprises, prior to said providing of, based on at least one of the set of predictions, the recommendation associated with the first respective prediction having been generated by the set of machine learning models: voting, by the set of machine learning models, for the first prediction by using the set of predictions with the respective accuracy metrics as a weight.

In one or more embodiments of the method, said providing of, based on the respective accuracy metrics, the recommendation associated with the first prediction having been generated by the set of machine learning models is in response to a first respective accuracy metric associated with the first respective prediction generated by a first machine learning model being above remaining respective accuracy metrics associated with the set of predictions.

In one or more embodiments of the method, the feature vector is a first feature vector, the set of predictions is a set of first predictions, and the recommendation is a first recommendation, and the method further comprises: obtaining a second feature vector for the given problem, generating, by the set of machine learning models, using the second feature vector, a set of second predictions, each respective second prediction being associated with a respective second accuracy metric, and providing, based on the respective second accuracy metrics, a second recommendation associated with a second respective prediction having been generated by a second machine learning model of the set of machine learning models.

In one or more embodiments of the method, the respective accuracy metric comprising a respective class-specific accuracy metric indicative of a respective performance of the respective machine learning model in predictions for a specific class, said providing of, based on at least one of the set of predictions, the recommendation is based on the respective class-specific accuracy metric.

In one or more embodiments of the method, the class-specific accuracy metric is determined based on a number of true positive (TP) past predictions and false positive (FP) past predictions.

In one or more embodiments of the method, the actual decision is associated with a user interaction parameter indicative of behavior of a user in performing the actual decision, and the method further comprises, prior to said training of, by the set of supervised machine learning algorithms, the set of machine learning models: determining at least one feature not having been used by the user for performing the actual decision, and said training of, by the set of supervised machine learning algorithms, the set of machine learning models is further based on the at least one feature.

In one or more embodiments of the method, said user interaction parameter comprising at least one of: an implicit user interaction obtained by a sensor of a client device of the user, and an explicit user interaction obtained by querying the user.

In one or more embodiments of the method, the initializing of, using the set of features associated with the given problem, the set of machine learning algorithms comprising: obtaining the set of features for the given problem, each feature being associated with a respective feature value range, generating, using the set of features associated with the respective feature value ranges, a set of training feature vectors, providing the set of training feature vectors for labelling thereof, obtaining, for each training feature vector of the set of training feature vectors, a respective label, and training, by the set of supervised machine learning algorithms, the set of machine learning models using the set of training feature vectors with the respective labels as a target, thereby resulting in a suitable initialization condition.

In one or more embodiments of the method, said initializing of, using the set of features associated with the given problem, the set of supervised machine learning algorithms comprising: obtaining the set of features for the given problem, obtaining a set of unlabelled feature vectors for the given problem, generating, for each of the set of unlabelled feature vectors, by the set of machine learning models, a respective set of predictions, providing, based on the respective set of predictions for each of the set of unlabelled feature vectors, a subset of the unlabelled feature vectors for annotation thereof, obtaining, for each of the subset of the unlabelled feature vectors, a respective label so as to obtain a subset of labelled feature vectors, and training, by the set of supervised machine learning algorithms, the set of machine learning models using the subset of labelled feature vectors with the respective labels as a target, thereby resulting in another suitable initialization condition.

In one or more embodiments of the method, the subset of unlabelled feature vectors comprising a single unlabelled feature vector.

In one or more embodiments of the method, the method further comprises, prior to said providing of the subset of unlabelled feature vectors comprising the single unlabelled feature vector: determining, for each of the set of unlabelled feature vectors, using the respective set of predictions, a respective disagreement score indicative of a difference in predictions of the set of machine learning models, and selecting, based on the respective disagreement score, from the set of unlabelled feature vectors, the single unlabelled feature vector.

In one or more embodiments of the method, said determining the respective disagreement score comprising determining a respective vote entropy for the respective set of predictions.

In one or more embodiments of the method, said determining the respective disagreement score comprising determining a respective Kullback-Leibler (KL) divergence for the respective set of predictions.

In one or more embodiments of the method, the respective labels are obtained from a user input/output interface connected to the processing device.

In one or more embodiments of the method, the processing device is connected to a database comprising a plurality of labelled feature vectors, and said initializing of, using the set of features associated with the given problem, the set of machine learning algorithms comprising: obtaining, from the database, a set of labelled feature vectors, each labelled feature vector being associated with a respective past decision, and training, by the set of supervised machine learning algorithms, the set of machine learning models using the set of labelled feature vectors with the respective past decisions as a target.

In one or more embodiments of the method, said obtaining of, from the database, the set of labelled feature vectors comprising: using random sampling on the plurality of labelled feature vectors of the database.

In one or more embodiments of the method, said obtaining of, from the database, the set of labelled feature vectors comprising: using Latin hypercube sampling on the plurality of labelled feature vectors of the database.

In one or more embodiments of the method, the set of supervised machine learning algorithms comprising at least one classification machine learning algorithm.

In one or more embodiments of the method, the at least one classification machine learning algorithm is a non-linear classification machine learning algorithm.

In one or more embodiments of the method, the set of machine learning algorithms comprising at least one regression machine learning algorithm.

In one or more embodiments of the method, the at least one regression machine learning algorithm is a non-linear machine learning algorithm.

In one or more embodiments of the method, the set of features are indicative of at least one of clinical features of a patient, and sensor features relating to the patient, and the prediction comprising a clinical decision.

In one or more embodiments of the method, said providing of the clinical decision causes a change of at least one parameter of a medical apparatus connected to the processing device.

In one or more embodiments of the method, the set of features are indicative of detected features of a vehicle, and the prediction comprising one of a target identification and a threat identification.

In one or more embodiments of the method, the set of features comprising features indicative of vehicle parameters, and the prediction comprising a control action.

In accordance with a broad aspect of the present technology, there is provided a method for generating a labelled training dataset for training a set of machine learning models for performing a prediction for a given problem, the method being executed by a processing device, the processing device being connected to a non-transitory storage medium comprising: a plurality of unlabelled feature vectors for the given problem, each of the plurality of unlabelled feature vectors having respective values for a set of features. The method comprises: initializing, by the set of supervised machine learning algorithms, using the set of features associated with the given problem, the set of machine learning models, obtaining, from the non-transitory storage medium comprising the plurality of unlabelled feature vectors, a first unlabelled feature vector for the given problem, obtaining, for the first unlabelled feature vector, a first prediction label to thereby obtain a first labelled feature vector, adding the first labelled feature vector associated with the first prediction label to the labelled training dataset, obtaining, from the non-transitory storage medium comprising the plurality of unlabelled feature vectors, a set of unlabelled feature vectors, determining, for each of the set of unlabelled feature vectors, using the set of machine learning models, a respective set of predictions, determining, for each of the set of unlabelled feature vectors, using the respective set of predictions, a respective disagreement score indicative of a difference in predictions of the set of machine learning models, selecting, based on the respective disagreement score, from the set of unlabelled feature vectors, a second unlabelled feature vector, obtaining, for the second unlabelled feature vector, a second prediction label to thereby obtain a second labelled feature vector, and adding, the second labelled feature vector associated with the second prediction label to the labelled training dataset.

In one or more embodiments of the method, said obtaining of the first unlabelled feature vector comprising: using uniform sampling on the plurality of unlabelled feature vectors of the non-transitory storage medium to obtain the first unlabelled feature vector.

In one or more embodiments of the method, said obtaining the first unlabelled feature vector comprising: using random sampling on the plurality of unlabelled feature vectors of the non-transitory storage medium to obtain the first unlabelled feature vector.

In one or more embodiments of the method, said obtaining, from the non-transitory storage medium, the first unlabelled feature vector comprising: using Latin hypercube sampling on the plurality of unlabelled feature vectors of the non-transitory storage medium to obtain the first unlabelled feature vector.

In one or more embodiments of the method, said obtaining of the first unlabelled feature vector comprising: generating the first unlabelled feature vector using the set of features.

In one or more embodiments of the method, said obtaining from the non-transitory storage medium, the set of unlabelled feature vectors comprising using pool-based sampling on the plurality of unlabelled feature vectors to obtain the set of unlabelled feature vectors.

In one or more embodiments of the method, said obtaining from the non-transitory storage medium, the set of unlabelled feature vectors comprising using stream-based sampling on the plurality of unlabelled feature vectors to obtain the set of unlabelled feature vectors.

In one or more embodiments of the method, the method further comprises, prior to said obtaining, for the first unlabelled feature vector, the first prediction label comprising: providing, to an assessor, the first unlabelled feature vector, the first prediction label is obtained from the assessor.

In one or more embodiments of the method, the method further comprises, prior to said obtaining of, for the second unlabelled feature vector, the second prediction label comprising: providing, to an assessor, the second unlabelled feature vector, the second prediction label is obtained from the assessor.

In accordance with a broad aspect of the present technology, there is provided a system for providing a recommendation for a given problem by using a set of machine learning models online, the given problem being associated with a set of features. The system comprises: a processing device, a non-transitory computer-readable storage medium operatively connected to the processing device, the non-transitory computer-readable storage medium comprising instructions, the processing device, upon executing the instructions, being configured for: initializing, using the set of features associated with the given problem, a set of supervised machine learning algorithms, upon detection of a suitable initialization condition: providing, by the set of supervised machine learning algorithms, the set of machine learning models for online inference, obtaining a feature vector for the given problem, generating, by the set of machine learning models, using the feature vector, a set of predictions, each respective prediction being associated with a respective accuracy metric, providing, based on at least one of the set of predictions, the recommendation associated with a first prediction having been generated by at least one of the set of machine learning models, obtaining an actual decision associated with the feature vector for the given problem, and training, by the set of supervised machine learning algorithms, the set of machine learning models using the feature vector and the actual decision as a label.

In one or more embodiments of the system, said initializing of, using the set of features associated with the given problem, the set of supervised machine learning algorithms is performed offline.

In one or more embodiments of the system, the processing device is further configured for, prior to said providing of, based on the respective accuracy metrics, the recommendation associated with the first respective prediction having been generated by the set of machine learning models: voting, by the set of machine learning models, for the first prediction by using the set of predictions with the respective accuracy metrics as a weight.

In one or more embodiments of the system, said providing of, based on the respective accuracy metrics, the recommendation associated with the first prediction having been generated by the set of machine learning models is in response to a first respective accuracy metric associated with the first respective prediction generated by a first machine learning model being above remaining respective accuracy metrics associated with the set of predictions.

In one or more embodiments of the system, the feature vector is a first feature vector, the set of predictions is a set of first predictions, and the recommendation is a first recommendation, and the processing device is further configured for: obtaining a second feature vector for the given problem, generating, by the set of machine learning models, using the second feature vector, a set of second predictions, each respective second prediction being associated with a respective second accuracy metric, and providing, based on the respective second accuracy metrics, a second recommendation associated with a second respective prediction having been generated by a second machine learning model of the set of machine learning models.

In one or more embodiments of the system, the respective accuracy metric comprising a respective class-specific accuracy metric indicative of a respective performance of the ML model in predictions for a specific class, said providing of, based on at least one of the set of predictions, the recommendation based on the respective class-specific accuracy metric.

In one or more embodiments of the system, the class-specific accuracy metric is determined based on a number of true positive (TP) past predictions and false positive (FP) past predictions.

In one or more embodiments of the system, the actual decision is associated with a user interaction parameter indicative of behavior of a user in performing the actual decision, and the processing device is further configured for, prior to said training of the set of machine learning models: determining at least one feature not having been used by the user for performing the actual decision, and said training of the set of machine learning models is further based on the at least one feature.

In one or more embodiments of the system, said user interaction parameter comprising at least one of: an implicit user interaction obtained by a sensor of a client device of the user, and an explicit user interaction obtained by querying the user.

In one or more embodiments of the system, the initializing of, using the set of features associated with the given problem, the set of machine learning models comprising: obtaining the set of features for the given problem, each feature being associated with a respective feature value range, generating, using the set of features associated with the respective feature value ranges, a set of training feature vectors, providing the set of training feature vectors for labelling thereof, obtaining, for each training feature vector of the set of training feature vectors, a respective label, and training the set of machine learning models using the set of training feature vectors with the respective labels as a target, thereby resulting in a suitable initialization condition.

In one or more embodiments of the system, said initializing of, using the set of features associated with the given problem, the set of machine learning models comprising: obtaining the set of features for the given problem, obtaining a set of unlabelled feature vectors for the given problem, generating, for each of the set of unlabelled feature vectors, by the set of machine learning models, a respective set of predictions, providing, based on the respective set of predictions for each of the set of unlabelled feature vectors, a subset of the unlabelled feature vectors for annotation thereof, obtaining, for each of the subset of the unlabelled feature vectors, a respective label so as to obtain a subset of labelled feature vectors, and training, by the set of supervised machine learning algorithms, the set of machine learning models using the subset of labelled feature vectors with the respective labels as a target, thereby resulting in another suitable initialization condition.

In one or more embodiments of the system, the subset of unlabelled feature vectors comprising a single unlabelled feature vector.

In one or more embodiments of the system, the processing device is further configured for, prior to said providing of the subset of unlabelled feature vectors comprising the single unlabelled feature vector: determining, for each of the set of unlabelled feature vectors, using the respective set of predictions, a respective disagreement score indicative of a difference in predictions of the set of machine learning models, and selecting, based on the respective disagreement score, from the set of unlabelled feature vectors, the single unlabelled feature vector.

In one or more embodiments of the system, said determining the respective disagreement score comprising determining a respective vote entropy for the respective set of predictions.

In one or more embodiments of the system, said determining the respective disagreement score comprising determining a respective Kullback-Leibler (KL) divergence for the respective set of predictions.

In one or more embodiments of the system, the respective labels are obtained from a user input/output interface connected to the processing device.

In one or more embodiments of the system, the processing device is connected to a database comprising a plurality of labelled feature vectors, and said initializing of, using the set of features associated with the given problem, the set of machine learning models comprising: obtaining, from the database, a set of labelled feature vectors, each labelled feature vector being associated with a respective past decision, and training, by the set of supervised machine learning algorithms, the set of machine learning models using the set of labelled feature vectors with the respective past decisions as a target.

In one or more embodiments of the system, said obtaining of, from the database, the set of labelled feature vectors comprising: using random sampling on the plurality of labelled feature vectors of the database.

In one or more embodiments of the system, said obtaining of, from the database, the set of labelled feature vectors comprising: using latin hypercube sampling on the plurality of labelled feature vectors of the database.

In one or more embodiments of the system, the set of supervised machine learning algorithms comprising at least one classification machine learning algorithm.

In one or more embodiments of the system, the at least one classification machine learning algorithm is a non-linear classification machine learning algorithm.

In one or more embodiments of the system, the set of machine learning models comprising at least one regression machine learning algorithm.

In one or more embodiments of the system, the at least one regression model is a non-linear regression machine learning algorithm.

In one or more embodiments of the system, the set of features are indicative of at least one of clinical features of a patient, and sensor features relating to the patient, and the prediction comprising a clinical decision.

In one or more embodiments of the system, said providing of the clinical decision causes a change of at least one parameter of a medical apparatus connected to the processing device.

In one or more embodiments of the system, the set of features are indicative of detected features of a vehicle, and the prediction comprising one of a target identification and a threat identification.

In one or more embodiments of the system, the set of features comprising features indicative of vehicle parameters, and the prediction comprising a control action.

In accordance with a broad aspect of the present technology, there is provided a system for generating a labelled training dataset for training a set of machine learning models for performing a prediction for a given problem. The system comprises: a processing device, a non-transitory computer-readable storage medium connected to the processing device, the non-transitory computer-readable storage medium storing: instructions, and a plurality of unlabelled feature vectors for the given problem, each of the plurality of unlabelled feature vectors having respective values for a set of features, the processing device, upon executing the instructions, being configured for: initializing, by the set of supervised machine learning algorithms, using the set of features associated with the given problem, the set of machine learning models, obtaining, from the non-transitory computer-readable storage medium comprising the plurality of unlabelled feature vectors, a first unlabelled feature vector for the given problem, obtaining, for the first unlabelled feature vector, a first prediction label to thereby obtain a first labelled feature vector, adding the first labelled feature vector associated with the first prediction label to the labelled training dataset, obtaining, from the non-transitory computer-readable storage medium comprising the plurality of unlabelled feature vectors, a set of unlabelled feature vectors, determining, for each of the set of unlabelled feature vectors, using the set of machine learning models, a respective set of predictions, determining, for each of the set of unlabelled feature vectors, using the respective set of predictions, a respective disagreement score indicative of a difference in predictions of the set of machine learning models, selecting, based on the respective disagreement score, from the set of unlabelled feature vectors, a second unlabelled feature vector, obtaining, for the second unlabelled feature vector, a second prediction label to thereby obtain a second labelled feature vector, and adding, the second labelled feature vector associated with the second prediction label to the labelled training dataset.

In one or more embodiments of the system, said obtaining of the first unlabelled feature vector comprising: using uniform sampling on the plurality of unlabelled feature vectors of the non-transitory computer-readable storage medium to obtain the first unlabelled feature vector.

In one or more embodiments of the system, said obtaining the first unlabelled feature vector comprising: using random sampling on the plurality of unlabelled feature vectors of the non-transitory computer-readable storage medium to obtain the first unlabelled feature vector.

In one or more embodiments of the system, said obtaining, from the non-transitory computer-readable storage medium, the first unlabelled feature vector comprising: using latin hypercube sampling on the plurality of unlabelled feature vectors of the non-transitory computer-readable storage medium to obtain the first unlabelled feature vector.

In one or more embodiments of the system, said obtaining of the first unlabelled feature vector comprising: generating the first unlabelled feature vector using the set of features.

In one or more embodiments of the system, said obtaining from the non-transitory computer-readable storage medium, the set of unlabelled feature vectors comprising using pool-based sampling on the plurality of unlabelled feature vectors to obtain the set of unlabelled feature vectors.

In one or more embodiments of the system, said obtaining from the non-transitory computer-readable storage medium, the set of unlabelled feature vectors comprising using stream-based sampling on the plurality of unlabelled feature vectors to obtain the set of unlabelled feature vectors.

In one or more embodiments of the system, the processing device is further configured for, prior to said obtaining, for the first unlabelled feature vector, the first prediction label comprising: providing, to an assessor, the first unlabelled feature vector, said first prediction label is obtained from the assessor.

In one or more embodiments of the system, the processing device is further configured for, prior to said obtaining of, for the second unlabelled feature vector, the second prediction label comprising: providing, to an assessor, the second unlabelled feature vector, said second prediction label is obtained from the assessor.

TERMS AND DEFINITIONS

In the context of the present specification, the terms "an aspect," "an embodiment," "embodiment," "embodiments," "the embodiment," "the embodiments," "one or more embodiments," "one or more other embodiments" "one or more alternative embodiments" "some embodiments," "certain embodiments," "one embodiment," "another embodiment" and the like mean "one or more (but not all) embodiments of the present technology," unless expressly specified otherwise. A reference to "another embodiment" or "another aspect" in describing an embodiment does not imply that the referenced embodiment is mutually exclusive with another embodiment (e.g., an embodiment described before the referenced embodiment), unless expressly specified otherwise.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drives, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
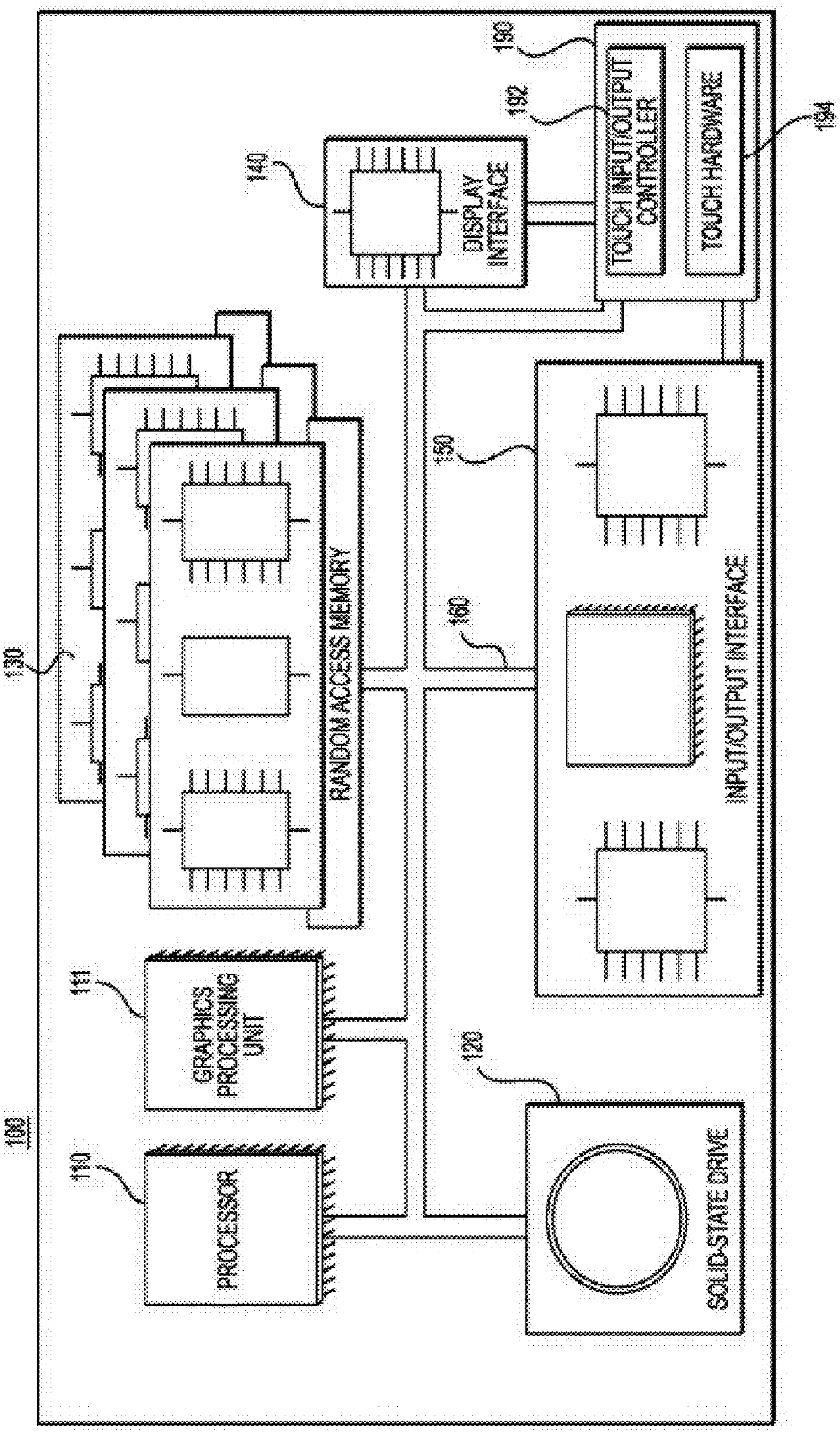
FIG. 1 depicts a schematic diagram of an electronic device in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", a "processing device" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In one or more non-limiting embodiments of the present technology, the processor or processing device may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Electronic Device

Referring to FIG. 1, there is shown an electronic device 100 suitable for use with some implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the one or more embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) allowing the user to interact with the electronic device 100 in addition or in replacement of the touchscreen 190.

According to implementations of the present technology, the solid-state drive 120 stores program instructions suitable for being loaded into the random-access memory 130 and executed by the processor 110 and/or the GPU 111 for performing online machine learning using a set of machine learning models. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

System

Figure 2:
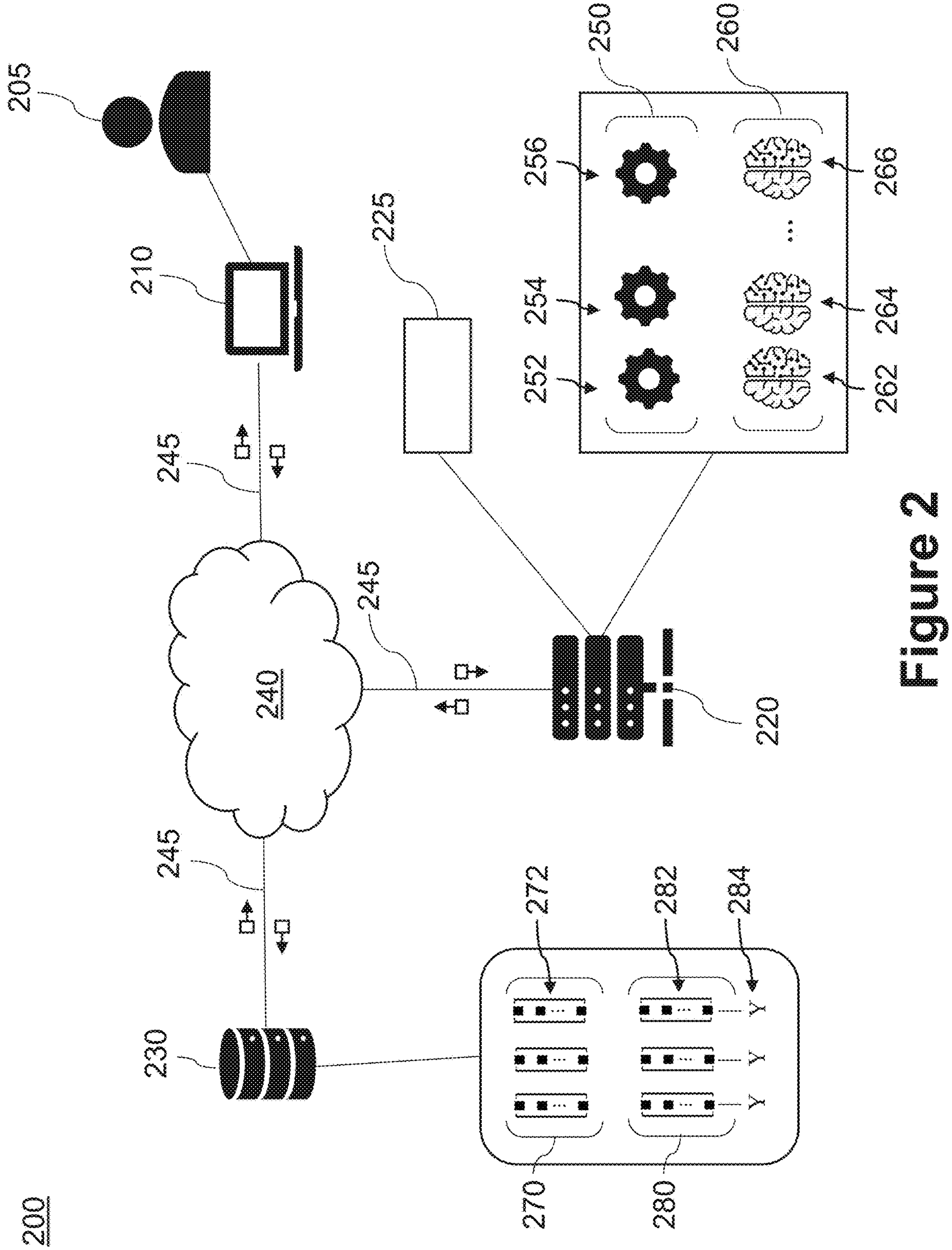
FIG. 2 depicts a schematic diagram of a system in accordance with one or more non-limiting embodiments of the present technology.

Referring to FIG. 2, there is shown a schematic diagram of a system 200, the system 200 being suitable for implementing one or more non-limiting embodiments of the present technology. It is to be expressly understood that the system 200 as shown is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 200 may provide in certain instances simple implementations of the present technology, and that where such is the case they have been presented in this manner as an aid to understanding. As persons skilled in the art would understand, various implementations of the present technology may be of a greater complexity.

The system 200 comprises inter alia a client device 210 associated with a user 205, a server 220, and a database 230 communicatively coupled over a communications network 240.

Client Device

The system 200 comprises a client device 210. The client device 210 is associated with the user 205. As such, the client device 210 can sometimes be referred to as a "electronic device", "end user device" or "client electronic device". It should be noted that the fact that the client device 210 is associated with the user 205 does not need to suggest or imply any mode of operation—such as a need to log in, a need to be registered, or the like.

The client device 210 comprises one or more components of the electronic device 100 such as one or more single or multi-core processors collectively represented by processor 110, the graphics processing unit (GPU) 111, the solid-state drive 120, the random access memory 130, the display interface 140, and the input/output interface 150.

It will be appreciated that the client device 210 may have different form factors, and may be for example implemented as a desktop computer, a computer onboard a vehicle, a tablet, a smart phone and the like.

In one or more embodiments, the user 205 may be a human expert in a given field and may analyze and/or interact with information displayed on a display interface of the client device 210 to perform labelling of training data, make decisions and/or predictions. It will be appreciated that the user 205 may also be a group of human experts.

The user 205 may receive recommendations from machine learning models for making decisions, provide actual predictions, features used for making decisions, parameters, and label or annotate objects related to decisions for training machine learning models.

Server

The server 220 is configured to inter alia: (i) obtain labelled and/or unlabelled objects and feature vectors thereof; (ii) access a set of machine learning algorithms (MLAs) 250; (iii) train one or more of the set of MLAs 250 using active learning and/or passive learning techniques to obtain a set of machine learning (ML) models 260; (iv)

evaluate the set of ML models 260; (v) provide an interface for labelling objects; (vi) perform online machine learning with the set of MLAs 250 and the set of ML models 260 by performing model selection and aggregation to provide recommendations; and (vii) generate training objects.

How the server 220 is configured to do so will be explained in more detail herein below.

It will be appreciated that the server 220 can be implemented as a conventional computer server and may comprise at least some of the features of the electronic device 100 shown in FIG. 1. In a non-limiting example of one or more embodiments of the present technology, the server 220 is implemented as a server running an operating system (OS). Needless to say that the server 220 may be implemented in any suitable hardware and/or software and/or firmware or a combination thereof. In the disclosed non-limiting embodiment of present technology, the server 220 is a single server. In one or more alternative non-limiting embodiments of the present technology, the functionality of the server 220 may be distributed and may be implemented via multiple servers (not shown).

The implementation of the server 220 is well known to the person skilled in the art. However, the server 220 comprises a communication interface (not shown) configured to communicate with various entities (such as the database 230, for example and other devices potentially coupled to the communication network 240) via the communication network 240. The server 220 further comprises at least one computer processor (e.g., the processor 110 of the electronic device 100) operationally connected with the communication interface and structured and configured to execute various processes to be described herein.

Machine Learning Algorithms (MLAs)

Figure 3:
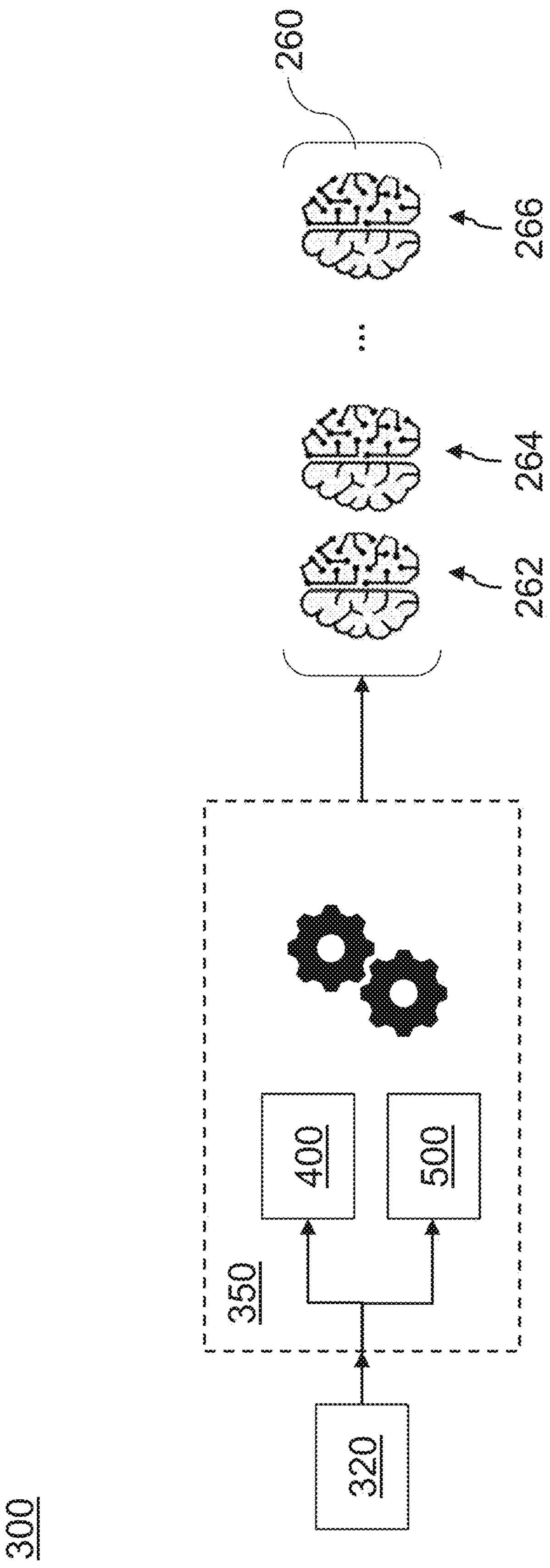
FIG. 3 depicts a schematic diagram of a machine learning initialization procedure in accordance with one or more non-limiting embodiments of the present technology.

The set of MLAs 250 comprise one or more supervised MLAs. In FIG. 3, the set of MLAs 250 comprises a first MLA 252, a second MLA 254, and a third MLA 256. It will be appreciated that the set of MLAs 250 may comprise two or more MLAs.

In the context of the present specification, a machine learning algorithm (MLA) is a procedure that is executed on training data to obtain a machine learning (ML) model. The ML model represents inter alia rules, numbers, and any other algorithm-specific data structures required to make predictions learned by a machine learning algorithm during training or after undergoing initialization.

In one or more embodiments, the set of MLAs 250 comprises inter alia a set of classification MLAs. Additionally or alternatively, the set of MLAs 250 may comprise a set of regression MLAs.

It will be appreciated that depending on the type of prediction task to be performed, i.e. classification or regression, the set of MLAs 250 may comprise only the set of classification MLAs, only the set of regression MLAs or a combination thereof.

The set of classification MLAs comprises one or more classification MLAs, also known as classifiers, which output models that attempt to estimate the mapping function (f) from the input variables (x) to one or more discrete or categorical output variables (y). The set of classification MLAs may include linear and/or non-linear classification MLAs.

Non-limiting examples of classification MLAs include: Perceptrons, Naive Bayes, Decision Tree, Logistic Regression, K-Nearest Neighbors, Artificial Neural Networks (ANN)/Deep Learning (DL), Support Vector Machines (SVM), and ensemble methods such as Random Forest, Bagging, AdaBoost, and the like.

The set of regression MLAs comprises one or more regression MLAs which output models that attempt to estimate the mapping function (f) from the input variables (x) to numerical or continuous output variables (y).

Non-limiting examples of regression MLAs include: Artificial Neural Networks (ANN)/Deep Learning (DL), Support Vector Machines (SVM), Linear Regression, Ordinary Least Squares Regression (OLSR), Stepwise Regression, Multivariate Adaptive Regression Splines (MARS), and Locally Estimated Scatterplot Smoothing (LOESS).

The set of MLAs 250 is configured to output a set of machine learning (ML) models 260 after undergoing initialization, which may comprise a knowledge capture phase, also known as a training or a learning phase, during which the set of MLAs 250 receive labelled data and output one or more ML models. In one or more other embodiments, the set of MLAs 250 outputs the set of ML models 260 after being initialized without performing the knowledge capture phase.

After undergoing initialization, the first MLA 252 outputs a first ML model 262, the second MLA 254 outputs a second ML model 264, and the third MLA 256 outputs a third ML model 266.

In one or more embodiments, the server 220 may execute one or more of the set of MLA 250 and/or the set of ML models 260. In one or more alternative embodiments, one or more of the set of MLA 250 may be executed by another server (not shown), and the server 220 may access the one or more of the set of MLA 250 for training or for use by connecting to the server (not shown) via an API (not shown), and specify parameters of the one or more of the set of MLA 250, transmit data to and/or receive data from the MLA 250, without directly executing the one or more of the set of MLA 250.

As a non-limiting example, one or more MLAs of the set of MLAs 250 may be hosted on a cloud service providing a machine learning API.

Interface

The server 220 is configured to provide an interface 225. The interface 225 may be accessible via the communication network 240 and used to exchange information with other electronic devices, such as provide objects for labelling to and obtain labels for objects from the client device 210 associated with user 205.

In one or more embodiments, the interface 225 may be integrated into a recommendation system and may be connected to various sensors and/or electronic devices.

As a non-limiting example, the user 205 may access the interface 225 via the client device 210, and obtain objects to label and provide labels to objects, as well as other data related to the set of MLAs 250.

Database

A database 230 is communicatively coupled to the server 220 and the client device 210 via the communications network 240 but, in one or more alternative implementations, the database 230 may be communicatively coupled to the server 220 without departing from the teachings of the present technology. Although the database 230 is illustrated schematically herein as a single entity, it will be appreciated that the database 230 may be configured in a distributed manner, for example, the database 230 may have different components, each component being configured for a particular kind of retrieval therefrom or storage therein.

The database 230 may be a structured collection of data, irrespective of its particular structure or the computer hardware on which data is stored, implemented or otherwise rendered available for use. The database 230 may reside on the same hardware as a process that stores or makes use of the information stored in the database 230 or it may reside on separate hardware, such as on the server 220. The database 230 may receive data from the server 220 for storage thereof and may provide stored data to the server 220 for use thereof.

As a non-limiting example, the database 230 may comprise a PostgreSQL database.

In one or more embodiments of the present technology, the database 230 is configured to store inter alia: (i) a problem definition, features, configuration parameters, user decision logs, model performance metrics, and model predictions of the set of MLAs 250 and the set of ML models 260; and (ii) a plurality of labelled objects 280 and/or a plurality of unlabelled objects 270.

The plurality of labelled objects 280, which is also referred to as the plurality of training objects 280 or the plurality of feature vectors 280, is a data collection of instances associated with respective labels which are used by the set of MLAs 250 to train the set of ML models 260. In the plurality of labelled objects 280, a given object 282 is associated with a respective label 284.

The plurality of unlabelled objects 270, which is also referred to as the plurality of unlabelled feature vectors 270, is a data collection of instances which are not associated with a respective label, i.e. a given object 272 of the plurality of unlabelled objects 270, is not associated with a respective label.

The nature of the given object 272, 282 is not limited, and a given object 272, 282 may be any digital representation of information. In one or more embodiments, a given object may be raw or unprocessed data in the form of byte code, a digital file or a document. In one or more other embodiments, a given object 272, 282 may include at least partially processed data.

As a non-limiting example, a given object may be a medical file of a given patient including one or more of text, pictures, and the like.

As another non-limiting example, a given object may include information detected by one or more sensor(s) such as cameras, RADARs, LIDARs, medical sensors, and the like.

Each given object 272, 282 is associated with or represented by a set of features. The set of features are explanatory variables quantifying properties of the given object 272, 282 and used by experts for making decisions and/or models for outputting a recommendation or prediction. The set of features may include one or more of: categorical features, ordinal features, integer-valued features, and real-valued features.

Thus, a given object 272, 282 in the database 230 may be represented by a feature vector, which is a list of numerical values for the set of features. It will be appreciated that a feature vector may represent categorical data in numerical form by performing as a non-limiting example integer encoding and/or one-hot encoding.

In one or more other embodiments, an indication of the given object 272, 282 may be stored together with a feature vector of the given object. In one or more alternative embodiments, the given object 272, 282 is stored in the database 230 and a feature vector may be extracted therefrom by a processing device.

The label 284, also referred to as a target 284, is the "answer" portion of an observation in supervised learning.

In one or more embodiments, in classification problems, the label 284 indicates to which of a set of categories or classes an object belongs to. The set of categories may include two categories for binary classification tasks or more than two categories for multiple classification tasks As a non-limiting example, for classification tasks, the class label may be "threat" or "not threat"; "spam" or "non-spam"; "A", "B" or "C"; "vehicle", "obstacle", "road", "stop", and the like.

In one or more embodiments, for regression tasks, the label 284 indicates a numerical value associated with the given object 282.

As a non-limiting example, in regression problems, the label may be "0.9", "181364.243", "5", or any other numerical value.

Communication Network

In one or more embodiments of the present technology, the communications network 240 is the Internet. In one or more alternative non-limiting embodiments, the communication network 240 may be implemented as any suitable local area network (LAN), wide area network (WAN), a private communication network or the like. It will be appreciated that implementations for the communication network 240 are for illustration purposes only. How a communication link 245 (not separately numbered) between the client device 210, the server 220, the database 230, and/or another electronic device (not shown) and the communications network 240 is implemented will depend inter alia on how each electronic device is implemented.

Machine Learning Initialization Procedure

With reference to FIG. 3, there is shown a schematic diagram of a machine learning initialization procedure 300 in accordance with one or more non-limiting embodiments of the present technology.

In one or more embodiments of the present technology, the server 220 executes the machine learning initialization procedure 300. In one or more alternative embodiments, the server 220 may execute at least a portion of the machine learning initialization procedure 300, and one or more other servers (not shown) may execute other portions of the machine learning initializing procedure 300. In one or more other embodiments, the client device 210 may execute at least a portion of the machine learning initialization procedure 300.

The purpose of the machine learning initialization procedure 300 is to initialize the set of MLAs 250 by: (i) initializing the model parameters and/or hyperparameters of the set of MLAs 250 during a model parameter initialization procedure 320; and (ii) training the set of MLAs 250 during a knowledge capture procedure 350 to obtain a set of ML models 260.

In one or more alternative embodiments, the knowledge capture procedure 350 may be optional, and the set of MLAs 250 may be initialized and output a set of ML models 260.

Parameter Initialization Procedure

During the model parameter initialization procedure 320, each of the set of MLAs 250 is initialized to output a respective one of the set of ML models 260. Each of the set of MLAs 250 may be initialized via its model parameters and/or hyperparameters.

It will be appreciated that depending on the type of prediction task and type and structure of MLA, the set of MLAs 250 may be initialized using different techniques known in the art.

The model parameters are configuration variables of the model used to perform predictions and which are estimated or learned from training data, i.e. the coefficients are chosen during learning based on an optimization strategy for outputting the prediction. The hyperparameters are configuration variables of the set of MLAs 250 which determine the structure of the set of ML models 260 and how the set of MLAs 250 is trained.

In one or more embodiments, where a given one of set of MLAs 250 is implemented as a neural network comprising a plurality of layers, each of the plurality of layers may be parametrized by a respective weight matrix, and a respective bias matrix. Thus, during the model parameter initialization procedure 320, each of the respective weight matrices and each of the respective bias matrices may be initialized with respective values.

In one or more embodiments, the hyperparameters include one or more of: a number of hidden layers and units, an optimization algorithm, a learning rate, momentum, an activation function, a minibatch size, a number of epochs, and dropout.

In one or more embodiments, the hyperparameters may be initialized using one or more of an arbitrarily predetermined search, a grid search, a random search and Bayesian optimization.

As a non-limiting example, for a decision tree model, model parameters may include feature tests, decisions nodes (which may correspond to logical if-then rules) and decision leafs (i.e. the class output), and hyperparameters may include max depth (i.e. max number of children nodes that may grow out from the tree until the tree is cut off) and min sample leaves (i.e. the minimum number of samples, or data points, that are required to be present in the leaf node)

It will be appreciated that in instances when the knowledge capture procedure 350 is not executed, the set of MLAs 250 is initialized to output the set of ML models 260 which are used for the online learning procedure 600, which will be explained in more detail herein below.

Knowledge Capture Procedure

The purpose of the knowledge capture procedure 350 is to train the set of MLAs 250 to learn and capture experts' decision rules based on the history of previous decisions, prior to online operational use. The knowledge capture procedure 350 is a learning or training phase of the set of MLAs 250, after which the set of models 260 are output. In one or more embodiments, the knowledge capture procedure 350 is only executed when a minimal number labelled objects can be obtained for training the set of MLAs 250.

The knowledge capture procedure 350 comprises a passive learning procedure 400, an active learning procedure 500, or a combination of an active learning procedure 500 and a passive learning procedure 400.

Passive Learning Procedure

Figure 4:
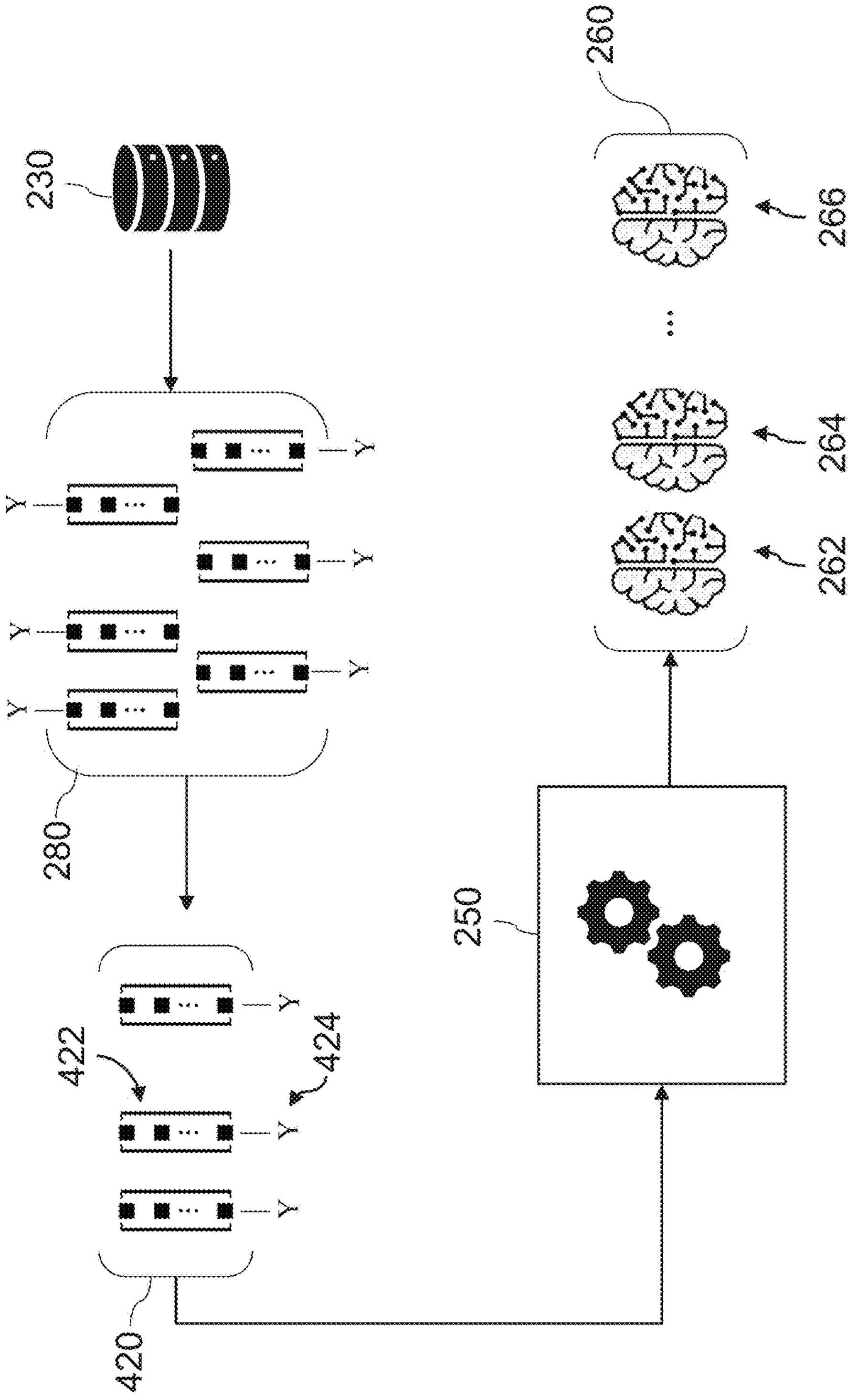
FIG. 4 depicts a schematic diagram of a passive learning procedure in accordance with one or more non-limiting embodiments of the present technology.

With reference to FIG. 4, during the passive learning procedure 400, the set of MLAs 250 are trained on a set of training objects 420, also referred to as the set of labelled objects 420, and output a set of ML models 260.

It will be appreciated that the passive learning procedure 400 may refer to one or more iterations of passive supervised training. The passive learning procedure 400 may be executed offline, when training objects may be obtained as a non-limiting example from the database 230.

The set of training objects 420 may comprise at least a portion of the plurality of training objects 280, i.e. the set of training objects 420 may be a proper or not a proper subset of the plurality of training objects 280 obtained from the database 230 and/or obtained from a non-transitory storage medium and/or obtained from another electronic device.

As a non-limiting example, the set of training objects 420 may include 500 training objects with associated labels.

The manner in which the set of training objects 420 are obtained is not limited. In one or more embodiments, the set of training objects 420 is obtained from the plurality of training objects 280 using random sampling. In one or more other embodiments, the set of training objects 420 is obtained from the plurality of training objects 280 using Latin hypercube sampling. In one or more embodiments, the set of training objects 420 is obtained from the plurality of training objects 280 using design of experiment methods. In one or more alternative embodiments, the the set of training objects 420 is obtained from the plurality of training objects 280 based on a list determined by a human operator.

It will be appreciated that in one or more alternative embodiments, the set of training objects 420 may be generated by the server 220.

In one or more embodiments, the set of training objects 420 is stored as a set of feature vectors 420 representing features of the set of objects, and each training object 422 or feature vector 422 is associated with a respective label 424.

In one or more embodiments, the set of training objects 420 is obtained by generating respective features vector for at least a portion of the plurality of training objects 280. Various feature extraction techniques known in the art may be used to extract features from objects to obtain feature vectors thereof.

It will be appreciated that the set of MLAs 250 train the set of ML models 260 in sequence, in parallel or a combination thereof using techniques known in the art.

During training, each of the set of MLAs 250 optimizes an objective function. It will be appreciated that a choice of the objective function depends on the type of prediction task at hand.

During training, internal parameters of each of the set of MLAs 250 are updated by performing predictions using the feature vectors, and by comparing the predictions with the labels. It will be appreciated that different batch sizes and number of iterations may be used for updating the parameters.

It will be appreciated that various regularization techniques may also be used for optimization thereof.

In one or more embodiments, k-fold cross-validation may be used on the set of training objects 420 for evaluating the set of ML models 260. As a non-limiting example, 10-fold cross-validation may be used for training the set of MLAs 250 and evaluating the set of ML models 260.

In one or more embodiments, the passive learning procedure 400 determines the performance in predictions of each of the set of ML models 260 by calculating a confusion matrix or error matrix detailing a number of false positives (FP), false negatives (FN), true positives (TP), and true negatives (TN). The prediction performance may be used to calculate a respective accuracy metric or respective class-specific accuracy metric for each of the set of ML models 260.

The passive learning procedure 400 may end when a suitable initialization condition defined by operators is detected. In one or more embodiments, the suitable condition may be based on a number of training objects, accuracy of predictions, and the like.

At the end of the passive learning procedure 400, a set of machine learning models 260 is output. The set of ML models 260 comprises a first ML model 262, a second ML model 264 and a third ML model 266.

In one or more alternative embodiments, after the passive learning procedure 400, the set of ML models 260 are deployed online for performing predictions by receiving feature vectors by executing the online learning procedure 600.

In one or more embodiments, the passive learning procedure 400 may be executed with the active learning procedure 400.

The set of models 260 can then receive a feature vector as an input and output a set of predictions. In one or more embodiments, each of the predictions output by a respective one of the set of ML models 260 is associated with a respective accuracy metric indicative of a confidence of the respective one of the set of ML models 260 in the output prediction.

Active Learning Procedure

Figure 5:
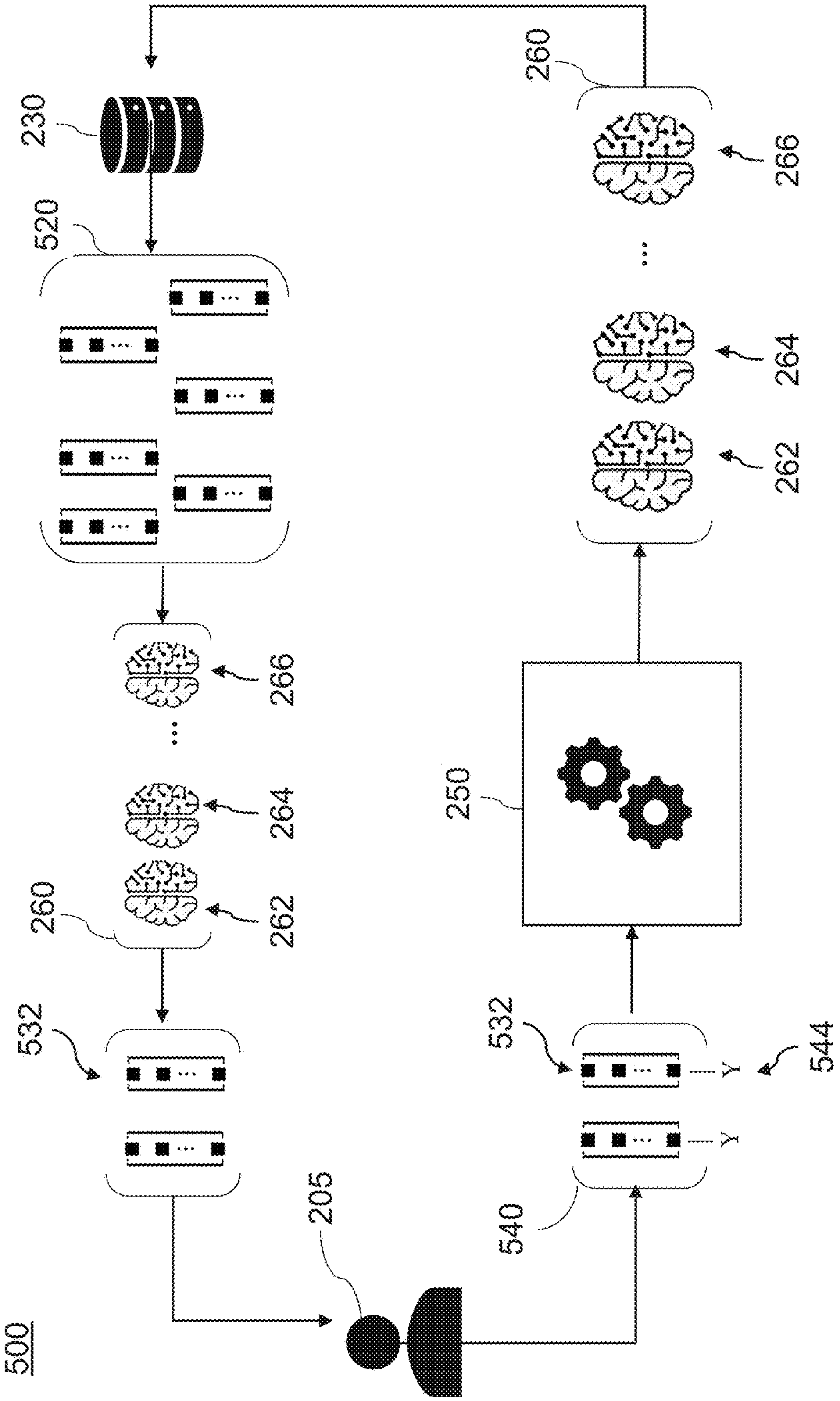
FIG. 5 depicts a schematic diagram of an active learning procedure in accordance with one or more non-limiting embodiments of the present technology.

With reference to FIG. 5, in accordance with one or more non-limiting embodiments of the present technology, there is shown an active learning procedure 500 during which the set of ML models 260 are trained by the set of MLAs 250 using active learning techniques.

It will be appreciated that the active learning procedure 500 is executed to select the most informative objects from a dataset of labelled objects, such as the plurality of labelled objects 280, or may be used to provide the most informative unlabelled objects from a dataset of unlabelled objects such as the plurality of unlabelled objects 280, for labelling by a human expert.

In one or more embodiments, iterations of the active learning procedure 500 and passive learning procedure 400 may be alternated.

The active learning procedure 500 comprises an instance selection procedure and a query strategy procedure.

The instance selection procedure is configured to generate or select one or more objects for labelling. The query strategy procedure is configured to determine which objects should be labelled using an informativeness measure.

Non-limiting examples of instance selection procedures that may be used include: membership query synthesis, stream-based selective sampling, and pool-based sampling.

Non-limiting examples of query strategy procedures that may be used include: uncertainty sampling, query-by-committee, expected model change, expected error reduction, variance reduction, and density-weighted methods.

Instance Selection Procedure

Membership Query Synthesis

In one or more embodiments, the instance selection procedure comprises a membership query synthesis, during which objects to label are generated based on predetermined feature types, ranges and underlying natural distributions. It will be appreciated that objects to label may be generated via their feature vectors, which may then be provided for labelling.

In one or more embodiments, the instance selection procedure obtains, for each feature of a set of features relevant to the prediction task, a respective feature type, and a respective feature value range. The set of features including feature types and feature value ranges may be for example input by an operator or may be obtained from the database 230. In one or more alternative embodiments, the set of features including feature types and feature value ranges may be obtained using unsupervised learning methods.

As explained herein above, the respective feature type for each feature may be one of: a categorical feature, an ordinal feature, an integer-valued feature, and a real-valued feature.

The respective feature value range depends on the respective feature type, and is indicative of the range of values a given feature type may take. As a non-limiting example, a binary feature may take "yes" or "no" values, a categorical feature may take "A", "B", "AB" or "O" values for blood type, an ordinal feature may take "large" "medium" or "small" values, a integer-valued feature may take a number of occurrences of an event, and a real-valued feature may take any real number value such as a measurement of blood pressure.

In one or more embodiments, the feature vectors may be generated randomly. In one or more other embodiments, the feature vectors may be generated using Latin hypercube sampling.

Thus, the instance selection procedure generates, for each feature of a set of features, a respective feature value to obtain a respective feature vector.

In one or more embodiments, the instance selection procedure generates feature values using random sampling. In one or more other embodiments, the instance selection procedure generates feature values using Latin hypercube sampling.

The instance selection procedure generates a set of unlabelled feature vectors 520 comprising one or more unlabelled feature vectors, which may then be provided for labelling.

In one or more embodiments, the set of unlabelled feature vectors 520 are subject to the query strategy procedure.

In one or more other embodiments, the set of unlabelled feature vectors 520 are provided to the client device 210 and may be labelled by the user 205. In one or alternative embodiments, where the instance selection procedure is executed locally on an electronic device having an input/output interface, the labelling may be provided via the input/output interface.

Pool-Based Sampling

In one or more embodiments, the instance selection procedure is configured to perform pool-based sampling. Pool-based sampling may be performed when a large pool of unlabelled objects are available, and where unlabelled objects are selectively drawn from the pool. The unlabelled objects are queried according to an informativeness measure which will be explained in more detail with respect to the query strategy procedure.

Stream-Based Selective Sampling

In one or more embodiments, the instance selection procedure is configured to perform stream-based selective sampling, also known as selective sampling. Stream-based selective sampling may be performed when an unlabelled object or feature vector may be obtained easily. The unlabelled object may be sampled from a distribution, and the set of MLAs 250 may decide whether or not to request its label.

The unlabelled object is generally drawn one at a time from a source, such as the database 230 comprising the plurality of unlabelled objects 280 or may be obtained from another electronic device.

It will be appreciated that the main difference between stream-based and pool-based active learning is that stream-based sampling scans through the data sequentially and makes query decisions individually, whereas pool-based sampling evaluates and ranks the entire collection before selecting the best query for labelling.

The active learning procedure 500 is configured to decide, for each received unlabelled object, whether or not to obtain a respective label. In one or more embodiments, the active learning procedure 500 performs the decision based on an informativeness measure or metric, which will be explained in more detail with respect to the query strategy procedure.

Query Strategy Procedure

The query strategy procedure is configured to: (i) evaluate the informativeness of unlabelled objects, which may be obtained after the instance selection procedure; and (ii)

provide a set of unlabelled objects comprising one or more unlabelled objects for labelling based on the informativeness measure.

In the context of the present technology, the query strategy procedure is performed by using the set of ML models 260, which are used to evaluate the informativeness of unlabelled objects.

In one or more embodiments, the query strategy procedure is performed using one or more of uncertainty sampling, query-by-committee, expected model change, expected error reduction, variance reduction, and density-weighted methods or variations thereof.

During the query strategy procedure, a set of unlabelled objects 520 comprising one or more unlabelled objects are obtained via the instance selection procedure.

In one or more embodiments, each of the set of ML models 260 processes the feature vector representing an object, and outputs a respective prediction to obtain a set of predictions for the set of ML models 260. Each respective prediction is associated with a respective accuracy metric.

The respective accuracy metric is a numerical value indicative of a confidence of the respective ML model in the prediction. In one or more embodiments, the respective accuracy metric comprises a respective probability. In one or more other embodiments, the respective accuracy metric comprises a confidence interval.

As such, the respective accuracy metric may be indicative of a performance in predictions of the respective ML model as a whole, or may be indicative of a performance of the respective ML model for each output class (class-specific accuracy metric).

It will be appreciated that the accuracy metric may be calculated for one or more of: training sets, hold-out sets, and test sets.

In one or more embodiments, the active learning procedure 500 determines or obtains a confusion matrix or error matrix detailing a number of false positives (FP), false negatives (FN), true positives (TP), and true negatives (TN) which may be used to calculate the respective accuracy metric or class-specific accuracy metric.

For classification problems, non-limiting examples of accuracy metrics include a proportion of correct classification (e.g. a ratio or percentage), a F1 score, a recall, a precision and a balanced accuracy.

For regression problems, non-limiting examples of accuracy metrics include root-mean squared error (RMSE) and a coefficient of determination (R2).

In one or more embodiments, for a given feature vector, a first prediction associated with a first accuracy metric is output by the first ML model 262, a second prediction associated with a second accuracy metric is output by the second ML model 264, and a third prediction associated with a third accuracy metric is output by the third ML model 266.

In one or more other embodiments, the respective prediction of each of the set of ML models 260 comprises a respective accuracy metric for each possible class. As a non-limiting example, if there are three possible classes for the given feature vector, each of the set of ML models 260 outputs accuracy metrics for each of the three classes.

In one or more embodiments, the query strategy procedure may use a disagreement score to select the feature vector for labelling. The disagreement score is indicative of a difference in predictions of the set of ML models 260 for the labelled feature vector. The purpose of the disagreement score is to quantify how the set of ML models 260 are "uncertain" about their respective predictions, which is indicative of the most informative feature vector that may be useful for training the set of MLAs 250.

The disagreement score is determined using the set of predictions. Additionally, the disagreement score may be determined using the set of predictions and the respective accuracy metrics associated with each respective prediction.

In one or more embodiments, the disagreement score is calculated using uncertainty sampling (for binary classification) or margin sampling (for multiple classes). In one or more other embodiments, the disagreement score is calculated using entropy.

In one or more embodiments, if the disagreement score of the set of ML models 260 is above a threshold, the feature vector is selected for labelling. It will be appreciated that depending on how the disagreement score is defined, the feature vector may be selected for labelling if the disagreement score is below a threshold.

In one or more embodiments, the disagreement score may be calculated using an "aggregated" accuracy metric. The query strategy procedure obtains an aggregated prediction and an associated aggregated accuracy metric by summing the respective predictions weighted by their respective accuracy metrics, and selects the feature vector for labelling only if the aggregated accuracy metric is above (or below) a predetermined threshold.

In one or more alternative embodiments, the query strategy procedure selects the feature vector for labelling based on a query-by-committee (QBC) algorithm, where each of the set of MLAs 250 votes to determine if the feature vector should be provided for labelling or not. It will be appreciated that various voting methods may be used.

In one or more embodiments, the query strategy procedure selects a subset of unlabelled feature vectors 532 comprising a feature vector 532 for labelling based on a majority vote. Additionally, the majority vote may be weighted by the respective accuracy metric. As a non-limiting example, if more than half of the set of ML models 260 have respective accuracy metrics below a threshold and/or have different predictions, the unlabelled feature vector may be selected for labelling.

The active learning procedure 500 selects one or more unlabelled feature vectors 532 for labelling based on the disagreement score.

The active learning procedure 500 provides the one or more unlabelled feature vectors 532 to an input/output interface for labelling. As a non-limiting example, the active learning procedure 500 may provide the one or more unlabelled feature vectors 532 to the client device 210 for display on the input/output interface 150 such as the touchscreen 190. The user 205 may analyze and label each of the one or more unlabelled feature vectors 532 with a respective label. Each of the labels may then be obtained by the active learning procedure 500 and associated with a respective unlabelled feature vector to obtain a set of labelled feature vectors 540.

In one or more alternative embodiments, where the active learning procedure 500 is used to select already labelled objects or feature vectors, the active learning procedure 500 obtains a respective label 544 for each of the one or more unlabelled feature vectors 532, thereby obtaining a set of labelled feature vectors 540.

The active learning procedure 500 then trains each of the set of MLAs 250 on the set of labelled feature vectors 540 to obtain the set of ML models 260. Typically, the set of labelled feature vectors 540 provides more information for learning than a set of labelled feature vector used with passive learning techniques and/or uses less labelled feature vectors to achieve the same performance of the models.

The active learning procedure 500 stores the set of labelled feature vectors 540 in the database 230.

In one or more embodiments, the set of labelled feature vectors 540 may be used to train other types of ML models not included in the set of MLAs 250.

It will be appreciated that in one or more non-limiting embodiments of the present technology, a hybrid active and passive learning procedure may be used for training the set of MLAs 250, where passive learning iterations are alternated with active learning iterations. In some instances, by alternating the methods for picking instances out from the pool (by mixing active and passive learning approaches), the risk of creating a bias in the training database (by focusing the selection on uncertain data instead of the representability of the whole problem of interest) is lower.

Online Learning Procedure

Figure 6:
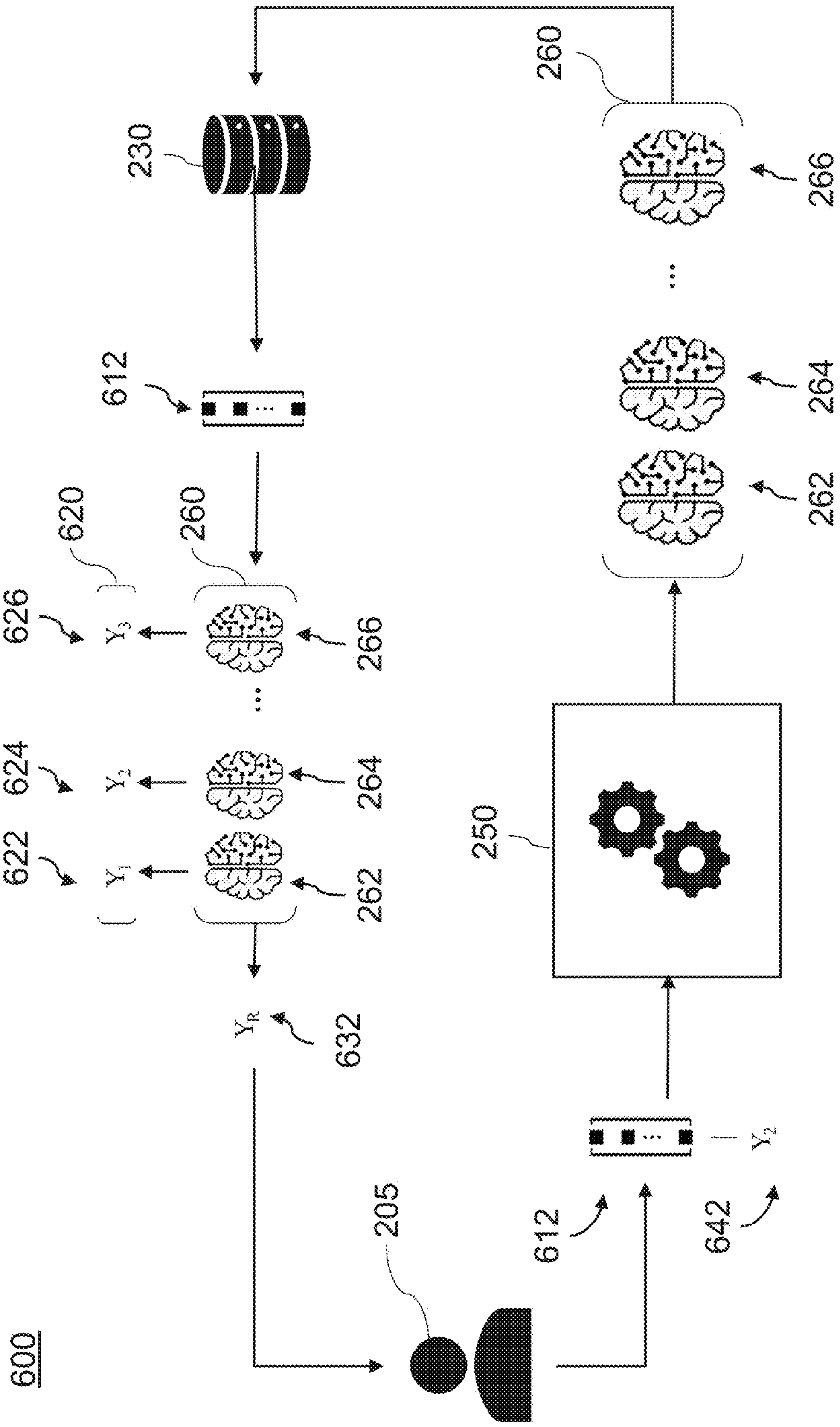
FIG. 6 depicts a schematic diagram of an online learning procedure in accordance with one or more non-limiting embodiments of the present technology.

Now turning to FIG. 6, there is shown a schematic diagram of an online learning procedure 600 executed in accordance with one or more non-limiting embodiments of the present technology.

In one or more embodiments of the present technology, the server 220 executes the online learning procedure 600. In one or more alternative embodiments, the server 220 may execute at least a portion of the online learning procedure 600, and one or more other servers (not shown) may execute other portions of the online learning procedure 600.

The online learning procedure 600 is performed using the set of MLAs 250, and is a procedure during which data becomes available in sequential order, and which is used to update the best predictor for future data at each step, as opposed to batch learning techniques which generate the best predictor by learning on an entire training data set at once, such as by performing the passive learning procedure 400.

It will be appreciated that the online learning procedure 600 may be executed similarly to the active learning procedure 500.

The online learning procedure 600 is executed asynchronously and continuously in real-time every time data to process becomes available, i.e. when an unlabelled feature vector 612 is obtained. Thus, the set of ML models 260 may be retrained as new labelled data is received, and the retraining of the set of ML models 260 may be set to start at each new decision or after a predetermined number of decisions, or occur on-demand or at a pre-specified time frequency. It will be appreciated that if one or more ML models is or are currently being trained and a recommendation or prediction is requested, the latest version of the one or more ML models may be used.

The online learning procedure 600 may be executed after the machine learning initialization procedure 300. It will be appreciated that the online learning procedure 600 may be executed after the initialization of the set of MLAs 250 to obtain the set of ML models 260 without executing a knowledge capture procedure 350. Thus, the set of ML models 260 may learn and adjust parameters in real-time.

In one or more embodiments, the online learning procedure 600 is executed upon detection of a suitable initialization condition. The suitable initialization condition depends on the type of task at hand, and/or the number of available training objects.

In one or more embodiments, the suitable initialization condition is based on a training threshold, where the online learning procedure 600 is executed after the set of MLAs 250 are trained on a sufficient number of training objects during the passive learning procedure 400 and/or active learning procedure 500.

In one or more embodiments, where the set of MLAs 250 comprises classification MLAs, the suitable initialization condition may be based on the number of training objects and the number of output classes. As a non-limiting example, the suitable initialization condition may be upon detection that the set of classification MLAs has been on trained on ten objects for each possible output class during the passive learning procedure 400 and/or the active learning procedure 500.

In one or more embodiments, where the set of MLAs 250 comprises regression MLAs, the suitable initialization condition may be based on the number of training objects the set of MLAs 250 has been trained on. As a non-limiting example, the suitable initialization condition may be ten training objects.

In one or more alternative embodiments, the suitable initialization condition may be based on an accuracy metric of at least a portion of the set of ML models 260.

The online learning procedure 600 uses the set of ML models 260 to perform recommendations to assist a human expert during inference in real-time. The recommendations may include predictions or may be based on predictions.

During the online learning procedure 600, the set of ML models 260 may obtain, for a given problem, a given object or an unlabelled feature vector 612 having been extracted from the given object.

In one or more embodiments, the feature vector 612 may be obtained based on information output by one or more sensor(s). In one or more other embodiments, the feature vector 612 may be obtained via feature extraction of an object, such as a document.

As a non-limiting example, the problem may be a medical diagnostic to assess whether to perform a medical procedure, such as intubating a patient, and the feature vector may include parameters of machine such as respirators as well as parameters related to the patient or its environment. In another non-limiting example, the problem may be whether a detected aircraft poses a threat or not. As another non-limiting example, the problem may be threat detection, and the feature vector may comprise sensor and environmental data of a detected entity such as a person, animal, vehicle, an electronic device and the like.

Each of the set of ML models 260 processes the feature vector 612. It will be appreciated that the processing of the feature vector 612 depends on the type and the architecture of the MLA that is used and may comprise intermediate processing steps.

Each of the set of ML models 260 outputs a respective prediction to obtain a set of predictions 620. The respective prediction may be associated with an accuracy metric or prediction score (not illustrated) which is indicative of a confidence of the respective ML model in the respective prediction for the feature vector 612.

In one or more embodiments, a first prediction 622 associated with a first accuracy metric (not illustrated) is output by the first ML model 262, a second prediction 624 associated with a second accuracy metric (not illustrated) is output by the second ML model 264, and a third prediction 626 associated with a third accuracy metric (not illustrated) is output by the third ML model 266.

The online learning procedure 600 outputs a recommendation 632 to the user 205 based on the set of predictions 620.

Different techniques may be used to output a recommendation 632 to the user 205.

In one or more embodiments, the online learning procedure 600 selects a prediction as a recommendation 632 based on the accuracy metrics associated with the set of predictions 620. The accuracy metrics may be the "global" accuracy metric (i.e., indicative of the performance of the model for making predictions for all the output classes) or may be a class-specific accuracy metric (i.e., indicative of the performance of the model for making predictions for each output class).

In one or more embodiments, the online learning procedure 600 selects the "best model" or most accurate model for the feature vector 612 dynamically, i.e. the ML model having the highest accuracy metric for the current prediction. It will be appreciated that by using this approach, at a different moment in time, for a different feature vector, the model associated with the prediction may be different from the model chosen previously or may be the same, depending on the accuracy metric. Thus, the online learning procedure 600 performs dynamic model selection by selecting the prediction associated with the highest accuracy metric for a given feature vector every time it is received and processed by the set of ML models 260.

In one or more embodiments, for classification problems, the accuracy metric is a class-specific accuracy metric or class-specific precision metric. The class-specific accuracy metric is indicative of a confidence of a given ML model in the prediction for a given class. The class-specific accuracy metric may be determined for each possible class of a set of possible classes. For a given class, the class-specific accuracy metric may be determined by using a confusion matrix and based on a number of true positives (TP) divided by the sum of true positives (TP) and false positives (FP) i.e., TP/(TP+FP). It will be appreciated that the number of true positives, false positives and the number of false negatives and true negatives may be determined based on past predictions performed during the online learning procedure 600, the passive learning procedure 400 and/or active learning procedure 500. Thus, the class-specific accuracy metric enables assessing the performance of a given ML model for a specific class, as a given ML model may be the model producing more accurate predictions for a first class (as compared to other ML models of the set of ML models 260), while another given ML model may be more accurate for predictions for a second class. Thus, the online learning procedure 600 may select a given prediction of the set of predictions 620 as the recommendation 632 based on the respective class-specific accuracy metrics of the set of predictions 620.

As a non-limiting example, the online learning procedure 600 may select the second prediction 624 output by the second ML model 264.

In one or more other embodiments, the online learning procedure 600 may provide the set of predictions 620 as a whole as a recommendation 632, which may enable the user 205 to analyze each of the set of predictions 620 and make his own decision.

It will be appreciated that various modifications may be performed, and intermediate steps and data used to generate the predictions when such data is available (e.g., feature values) may be provided to the user 205, which may enable the user 205 to analyze the recommendations to perform a decision.

In one or more embodiments, the online learning procedure 600 determines the recommendation 632 based on a voting mechanism. As a non-limiting example, the online learning procedure 600 may select as the recommendation 632 the prediction having been provided by a majority of the set of MLAs 250 using the respective accuracy metrics (global or class-specific) associated with the predictions as weights.

The recommendation 632 comprising the selected prediction of the set of ML models 260 is transmitted to the client device 210 for display to assist the user 205. In one or more alternative embodiments, the recommendation 632 may be transmitted to another input/output interface or stored in a non-transitory storage medium.

In one or more embodiments, the recommendation 632 or an indication thereof is transmitted to an electronic device, and causes the electronic device to perform an action. As a non-limiting example, the recommendation 632 may cause a vehicle to perform a maneuver, or a medical apparatus to perform adjustment of a parameter.

In one or more embodiments, the online learning procedure 600 receives feedback from the user 205 in the form of an actual prediction 642 or actual decision 642. The user 205 may have made a decision based on the recommendation 632 and/or other factors. The user 205 may input the actual prediction 642 which may be transmitted automatically to the online learning procedure 600 and/or stored by the server 220 and/or client device 210.

In one or more embodiments, the processor 110 obtains a user interaction of the user 205 when the user 205 performs the actual prediction 642 based on the feature vector 612 in the form a user interaction parameter, so as to perform process tracing. The user interaction of the user 205 is indicative of the behavior of the user 205 when making the actual prediction 642, and may be correlated with the features considered by the user 205 when performing the actual prediction 642 based on the feature vector 612. As such, the user 205 may for example give more weight to one or more features, and/or ignore one or more other features when performing the actual prediction 642 based on the feature vector 612.

The user interaction of the user 205 obtained by the server 220 may comprise an implicit user interaction, an explicit user interaction or a combination thereof.

The implicit user interaction may be obtained via sensors and actual user interactions of the user 205 with the interface of the client device 210. As a non-limiting example, in one or more embodiments where the user 205 uses a graphical interface to make a decision, a position of a cursor, a position of a finger of the user 205, a scrolling speed, a time spent on a given portion of the interface providing feature values or any other engagement metric may be recorded and/or determined in the form of a user interaction parameter and transmitted for analysis to the processor 110 of the server 220. As another non-limiting example, the client device 210 may track the eye movement of the user 205 with a camera of the client device 210 to determine which features the user 205 has considered when performing the actual prediction 642. Data from other types of sensors such as sensors recording electrophysiologic activity of the user 205 including heart rate sensors, and electroencephalographs (EEG) may also be used to correlate and determine the features considered by the user 205.

The explicit user interaction may be obtained explicitly from the user 205 via the client device 210. As a non-limiting example, the feature values of the feature vector 612 (or a corresponding representation thereof) may be at least partially hidden, and the user 205 may request to see the feature and feature values required to make the actual decision 642, which enables directly assessing the relative importance of the features used to perform the actual prediction 642 by the user 205, i.e. in some instances, the user 205 may not consider all features available and used by the set of ML models 260 to perform the actual prediction 642. Thus, the user interaction parameter may be obtained by directly querying the user 205 and/or by the user 205 querying the server 220.

In one or more alternative embodiments, the user interactions obtained from the client device 210 may be used to weight one or more features in the feature vector 612, i.e. give more relative importance to the one or more features by the set of ML models 260.

In one or more embodiments, the processor 110 may flag some features with a "don't care about this attribute value" flag based on the obtained user interaction parameter from the client device 210. By flagging such features, the processor 110 may generate a plurality of training feature vectors based on a single feature, where the flagged features may have different "fictional" values generated by the processor 110 so as to train the set of ML models 260 in a frugal manner by generating more training examples from a single feature vector. In this manner, the set of ML models 260 may be trained to give less importance or ignore feature values in specific contexts. It will be appreciated that this may enable personalizing the set of ML models 260 to the user 205 (or groups of user) in that specific context. It will be appreciated that the user interactions associated with the actual decision 642 may be used for training a single ML model in a frugal manner or for training a plurality of ML models in a frugal manner.

In one or more embodiments, the online learning procedure 600 compares the actual prediction 642 with the recommendation 632 provided by the set of ML models 260.

If the comparison results in a mismatch between the actual prediction of the user 205 and the prediction of the set of ML models 260, the feature vector 612 may be stored with the actual prediction 642 as a labelled training feature vector in the database 230.

It will be appreciated that a mismatch may be calculated based on the respective accuracy metric or may be based on the recommendation 632 of the set of ML models 260 being different from the actual prediction 642 of the user 205.

In one or more embodiments, the set ML models 260 is retrained on the performed predictions after a predetermined number of actual predictions are acquired and/or after a predetermined number of iterations, which enables continuously improving the performance of the set of ML models 260.

It will be appreciated that different criteria may be established by operators during the online learning procedure 600, such as decreasing the number of models in time, adding new MLAs and the like.

Additionally, or alternatively, the online learning procedure 600 enables building a training dataset by receiving actual feedback from experts, which may be used to train other types or architecture of MLAs.

Method Description

Figure 7:
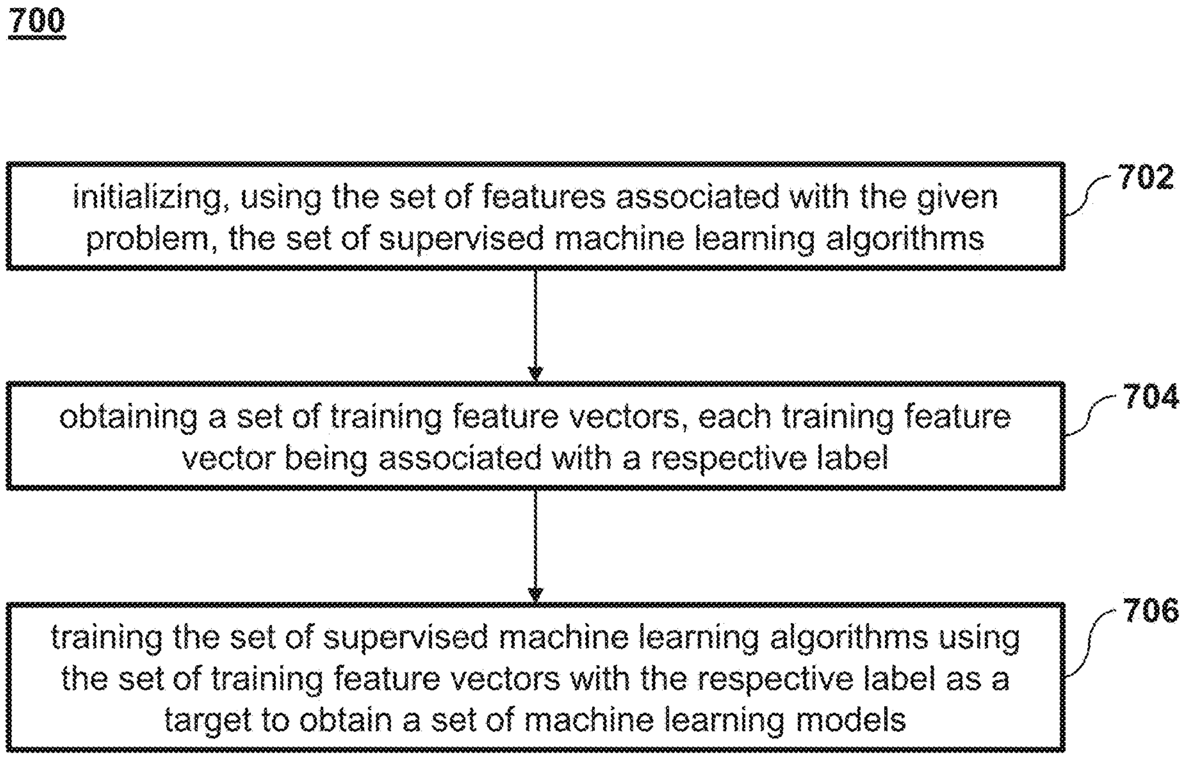
FIG. 7 depicts a flowchart of a method for training a set of machine learning algorithms using passive learning in accordance with one or more non-limiting embodiments of the present technology.

FIG. 7 depicts a flowchart of a method 700 of training a set of machine learning algorithms using passive learning in accordance with one or more non-limiting embodiments of the present technology.

It will be appreciated that steps of the method 700 may be executed with steps of the method 800, i.e., combining active learning and passive learning with multiple machine learning models.

In one or more embodiments, the server 220 comprises a processing device such as the processor 110 and/or the GPU 111 and a non-transitory computer-readable storage medium such as the solid-state drive 120 and/or the random-access memory 130 storing computer-readable instructions. The processing device, upon executing the computer-readable instructions, is configured to execute the method 700.

The method 700 begins at processing step 702.

At processing step 702, the processing device initializes, using a set of features associated with a given problem, the set of MLAs 250.

The processing device initializes the set of MLAs 250 by initializing the model parameters and hyperparameters based on the set of features associated with the given problem.

The set of MLAs 260 comprises one or more classification MLAs. In one or more alternative embodiments, the set of MLAs 260 comprises one or more regression MLAs. It will be appreciated that the choice of the set of MLAs 260 depends on the given problem and/or the set of features.

At processing step 704, the processing device obtains a set of training feature vectors, with each training feature vector being associated with a respective label.

In one or more embodiments, the processing device obtains the set of training feature vectors from the database 230 and/or from a storage medium connected to the processing device.

In one or more embodiments, the set of training feature vectors may be the set of training objects 420 obtained from the plurality of training objects 280 stored in the database 230, where each training object 422 is associated with a respective label 424.

In one or more other embodiments, the processing device obtains the set of training feature vectors by extracting features from the plurality of labelled objects 280 in the database 230. It will be appreciated that the feature vectors may be extracted by the set of ML models 260 or may be extracted by using other techniques known in the art for extracting features from data.

At processing step 706, the processing device trains the set of MLAs 250 using the set of training feature vectors, e.g. the set of training objects 420 based on the features thereof with the respective labels as a target to obtain the set of ML models 260.

It will be appreciated that during training of the set of MLAs 250, model parameters may be updated by using an objective function based on the labels and performed predictions until a suitable condition (e.g. convergence) is reached. It will be appreciated that cross-validation techniques may be used for training and assessing the set of MLAs 250.

Upon detection of the suitable initialization condition, the set of MLAs 250 outputs the set of ML models 260. In one or more embodiments, the set of ML models 260 comprises a first ML model 262, a second ML model 264, and a third ML model 266. It will be appreciated that the number of ML models in the set of ML models 260 is not limited.

The method 700 ends.

Figure 8:
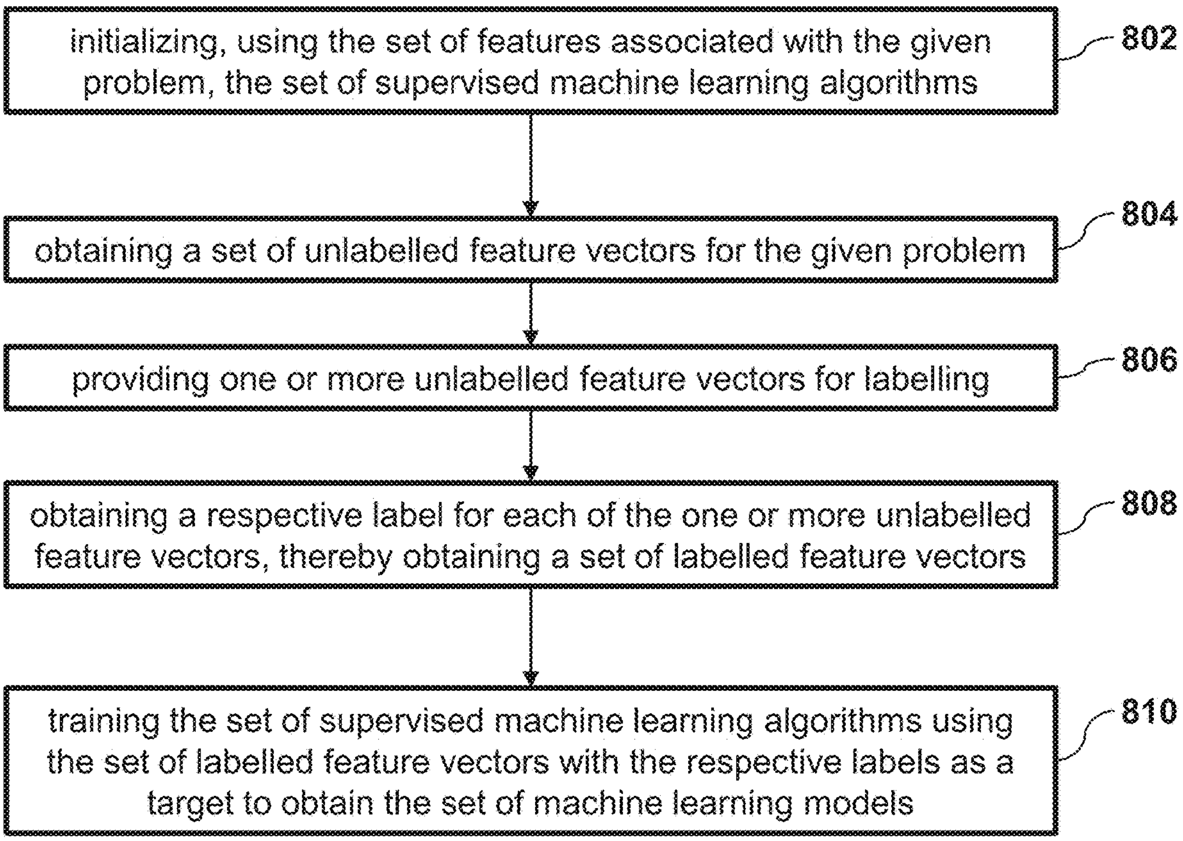
FIG. 8 depicts a flowchart of a method for training a set of machine learning algorithms using active learning in accordance with one or more non-limiting embodiments of the present technology.

FIG. 8 depicts a flowchart of a method 800 of training a set of machine learning algorithms using active learning in accordance with one or more non-limiting embodiments of the present technology.

In one or more embodiments, the server 220 comprises a processing device such as the processor 110 and/or the GPU 111 and a non-transitory computer-readable storage medium such as the solid-state drive 120 and/or the random-access memory 130 storing computer-readable instructions. The processing device, upon executing the computer-readable instructions, is configured to execute the method 800.

The method 800 begins at processing step 802.

At processing step 802, the processing device initializes, using a set of features associated with a given problem, the set of MLAs 250.

In one or more embodiments, the processing device initializes the set of MLAs 250 by initializing the model parameters and hyperparameters.

At processing step 804, the processing device obtains a set of unlabelled feature vectors or set of unlabelled objects 520 comprising one or more unlabelled objects for the given problem. In one or more embodiments, the processing device obtains the set of unlabelled feature vectors via an instance selection procedure, as explained above.

The instance selection procedure may be one of membership query synthesis, pool-based sampling, and stream-based sampling, as described herein above.

In one or more embodiments, the processing device obtains for each feature of a set of features relevant to the prediction task for the given problem, a respective feature type, and a respective feature value range. The processing device generates, for each feature of a set of features, a respective feature value to obtain a respective feature vector. The processing device obtains the set of unlabelled feature vectors.

In one or more embodiments, the feature vectors may be generated randomly. In one or more other embodiments, the feature vectors may be generated using latin hypercube sampling.

In one or more embodiments, the processing device performs pool-based sampling when a large pool of unlabelled objects are available, and where unlabelled objects are selectively drawn from the pool, i.e. the set of unlabelled objects 520 is obtained from the plurality of unlabelled objects 270 using an informativeness measure.

In one or more embodiments, the informativeness measure is obtained using one or more of uncertainty sampling, query-by-committee, expected model change, expected error reduction, variance reduction, and density-weighted methods or variations thereof.

In one or more embodiments, each of the set of ML models 260 processes the feature vector representing an object, and outputs a respective prediction to obtain a set of predictions for the set of ML models 260. Each respective prediction is associated with a respective accuracy metric.

In one or more embodiments, the informativeness measure is based on a disagreement score.

The disagreement score is determined using the set of predictions. Additionally, the disagreement score may be determined using the set of predictions and the respective accuracy metrics associated with each respective prediction.

The instance selection procedure generates a set of unlabelled feature vectors 520 comprising one or more unlabelled feature vectors, which may then be provided for labelling to the user 205.

In one or more embodiments, the set of unlabelled objects 520 is obtained and each unlabelled object is generally drawn one at a time from a source, such as the database 230 comprising a plurality of unlabelled objects 280 or may be obtained from another electronic device.

In one or more embodiments, the query strategy procedure is performed using one or more of uncertainty sampling, query-by-committee, expected model change, expected error reduction, variance reduction, and density-weighted methods or variations thereof.

At processing step 806, the processing device provides one or more unlabelled feature vectors for labelling. In one or more embodiments, the processor provides the one or more unlabelled feature vectors 532 for labelling based on the disagreement score. The processing device provides the one or more unlabelled feature vectors for labelling by transmitting an indication thereof to an input/output interface, such as the display interface of the client device 210 or another device (not illustrated) connected to the server 220.

At processing step 808, the processing device obtains a respective label 544 for each of the one or more unlabelled feature vectors 532, thereby obtaining a set of labelled feature vectors 540. The processing device may obtain the respective labels from the client device 210 or another device connected to the processing device.

At processing step 810, the processing device trains the set of MLAs 250 using the set of labelled feature vectors 540 with the respective labels as a target to obtain the set of ML models 260

The method 800 then ends.

Figure 9:
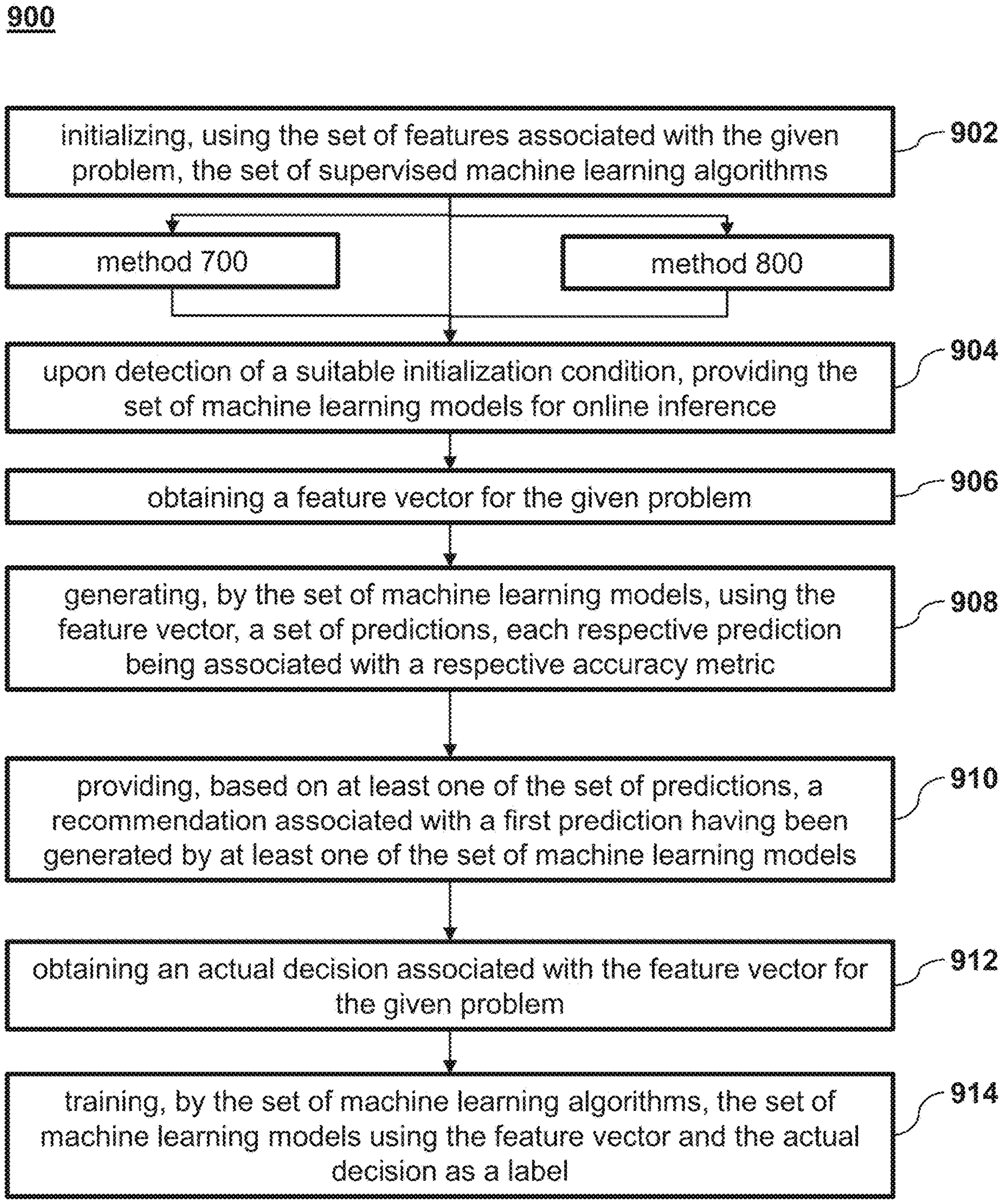
FIG. 9 depicts a flowchart of a method of online machine learning in accordance with one or more non-limiting embodiments of the present technology.

FIG. 9 depicts a flowchart of a method 900 of online machine learning using in accordance with one or more non-limiting embodiments of the present technology.

The method 900 is executed online, asynchronously and in real-time.

In one or more embodiments, the server 220 comprises a processing device such as the processor 110 and/or the GPU 111 and a non-transitory computer-readable storage medium such as the solid-state drive 120 and/or the random-access memory 130 storing computer-readable instructions. The processing device, upon executing the computer-readable instructions, is configured to execute the method 900.

The method 900 begins at processing step 902.

At processing step 902, the processing device initializes, using the set of features associated with the given problem, the set of MLAs 250.

In one or more embodiments, the method 700 is executed as part of processing step 902. In one or more other embodiments, the method 800 is executed as part of processing step 902. In one or more alternative embodiments, a combination of method 700 and method 800 is executed as part of processing step 902.

At processing step 904, upon detection of a suitable initialization condition, the processing device provides the set of ML models 260 for online inference.

The suitable initialization condition depends on the type of task at hand, and the number of available training objects.

In one or more embodiments, the suitable initialization condition is based on a training threshold, after the set of MLAs 250 is trained on a sufficient number of training objects during the method 700 and/or the method 800.

In one or more embodiments, where the set of MLAs 250 comprises classification MLAs, the suitable initialization condition may be based on the number of training objects and the number of output classes. As a non-limiting example, the suitable initialization condition may be upon detection that the set of classification MLAs has been on trained on 10 objects for each possible output class during the method 700 and/or the method 800.

In one or more embodiments, where the set of MLAs 250 comprises regression MLAs, the suitable initialization condition may be based on the number of training objects the set of ML models 260 has been trained on. As a non-limiting example, the suitable initialization condition may be ten training objects.

At processing step 906, the processing device obtains a feature vector 612 for the given problem.

In one or more embodiments, the processing device obtains an object for the given problem and extracts the feature vector 612 therefrom. It will be appreciated that features may be extracted from the object to obtain the feature vector 612 using known feature extraction techniques. In one or more other embodiments, the feature vector 612 is extracted by the set of ML models 260.

At processing step 908, the processing device uses the set of ML models 260 to generate, using the feature vector 612, a set of predictions 620, each respective prediction being associated with a respective accuracy metric indicative of a confidence of the ML model in the prediction.

In one or more embodiments, a first prediction 622 associated with a first accuracy metric is output by the first ML model 262, a second prediction 624 associated with a second accuracy metric is output by the second ML model 264, and a third prediction 626 associated with a third accuracy metric is output by the third ML model 266.

For classification problems, non-limiting examples of accuracy metrics include a proportion of correct classification (e.g. a ratio or percentage), a F1 score, a recall, a precision and a balanced accuracy.

For regression problems, non-limiting examples of accuracy metrics include root-mean squared error (RMSE) and a coefficient of determination (R2).

At processing step 910, the processing device provides, based on at least one of the set of predictions 620, a recommendation associated with a first prediction having been generated by at least one of the set of supervised ML models 260.

In one or more embodiments, the processing device selects a given prediction as a recommendation 632 based on the accuracy metric. The accuracy metric may be a global accuracy metric or class-specific accuracy metric.

The processing device selects the "best model" or most accurate model for the feature vector 612, i.e. the ML model having the highest accuracy metric for the prediction. It will be appreciated that by using this approach, at a different moment in time, for a different feature vector, the ML model associated with the selected prediction may be different from the ML model associated with a previously selected prediction or may be the same. Thus, the processing device performs dynamic model selection by selecting the prediction associated with the highest accuracy metric for a given feature vector.

In one or more alternative embodiments, for classification problems, the accuracy metric comprises a class-specific accuracy metric or class-specific precision metric. The class-specific accuracy metric is indicative of a confidence or performance of a given ML model in the prediction for a given class. The class-specific accuracy metric may be determined for each possible class of a set of possible classes. In one or more embodiments, the class-specific accuracy metric is determined based on a confusion matrix. For a given class, the class-specific accuracy metric may be determined based on a number of true positives (TP) divided by the sum of true positives (TP) and false positives (FP) i.e., TP/(TP+FP).

It will be appreciated that the number of true positives, false positives and additionally the number of false negatives and true negatives may be determined based on past predictions performed after the execution of the method 700 and/or the method 800. Thus, the class-specific accuracy metric enables assessing the performance of a given ML model for a specific class, as a given ML model may be the model producing more accurate predictions for a first class (as compared to other ML models of the set of ML models 260), while another given ML model may be more accurate for predictions for a second class.

In one or more other embodiments, the processing device may provide the whole set of predictions 620 as a recommendation 632, which may enable the user 205 to analyze each of the set of predictions 620 and make its own decision.

In one or more embodiments, the processing device selects the recommendation 632 based on a vote between the set of ML models 260. The votes may be weighted by the respective accuracy metric of each of the set of predictions 620. In one or more other embodiments, the processor 110 selects the recommendation 632 based on a vote between the set of ML models 260 by using the respective class-specific accuracy metric as a weight.

In one or more embodiments, the processing device selects the recommendation 632 based on a threshold. The threshold may be predetermined by an operator and/or may be based on the accuracy metrics.

In one or more embodiments, the processing device transmits the recommendation over the communication network 240 for display on an input/output interface such as the touchscreen 190 of the client device 210 of the user 205.

In one or more embodiments, the method 900 ends at processing step 910.

At processing step 912, the processing device obtains an actual decision 642 associated with the feature vector 612 for the given problem. In one or more embodiments, the actual decision 642 is provided by the user 205. In one or more embodiments, the processing device obtains the actual decision 642 from the client device 210 or from the database 230.

In one or more embodiments, the processing device compares the actual decision 642 with the recommendation 632. If there is a mismatch between the actual decision 642 of the user 205 and the recommendation 632, the processing device may store the feature vector 612 together with the actual prediction 642 as a labelled training feature vector, which may be used for retraining the set of ML models 260 by the set of MLAs 250.

In one or more embodiments, the processing device obtains a user interaction of the user 205 when performing the actual decision 642 based on the feature vector 612 so as to perform process tracing. The user interaction of the user 205 is indicative of the behavior of the user 205 when making the actual prediction 642, and may be correlated with the features considered by the user 205 when performing the actual decision 642 based on the feature vector 612. As such, the user 205 may for example give more weight to one or more features, and/or ignore one or more other features when performing the actual decision 642 for the feature vector 612, which may be used to "fine-tune" the set of ML models 260.

The user interaction of the user 205 obtained by the server 220 may comprise an implicit user interaction, an explicit user interaction or a combination thereof.

The implicit user interaction may be obtained via sensors and actual user interactions of the user 205 with the user interface of the client device 210. As a non-limiting example, in one or more embodiments where the user 205 uses a user interface to make a decision, a position of a cursor, a position of a finger of the user 205, a scrolling speed, a time spent on a given portion of the interface providing feature values or any other engagement metric may be recorded and/or determined and transmitted for analysis to the processing device of the server 220. As another non-limiting example, a camera on the client device 210 may track the eye movement of the user 205 to determine which features the user 205 has considered when performing the actual prediction 642. Data from other types of sensors such as sensors recording electrophysiologic activity of the user 205 including heart rate sensors, and electroencephalographs (EEG) may also be used to correlate and determine the features considered by the user 205.

The explicit user interaction may be obtained explicitly from the user 205 via the client device 210. As a non-limiting example, the feature values of the feature vector 612 may be at least in part hidden, and the user 205 may request to view the feature and feature values required to make the actual prediction 642, and thus the request enables directly assessing the relative importance of the features used to perform the actual prediction 642 by the user 205.

In one or more alternative embodiments, the user interaction obtained from the client device 210 may be used to weigh one or more features in the feature vector 612, i.e. give more relative importance to the one or more features used by the user 205 and less importance to one or more features not used by the user 205.

In one or more embodiments, the processing device may flag some features with a "don't care about this attribute value" flag based on the obtained user interactions from the client device 210. By flagging such features, the processing device may generate a plurality of training feature vectors based on a single feature, where the flagged features may have different "fictional" values generated by the processing device so as to train the set of ML models 260 in a frugal manner by generating more training examples from a single feature vector. In this manner, the set of ML models 260 may be retrained to give less importance or ignore feature values in specific contexts. It will be appreciated that the user interactions associated with the actual decision 642 may be used for training a single ML model or for training a plurality of ML models.

It will be appreciated that processing steps 904 to 910 may be repeated every time a feature vector is obtained by the processing device.

At processing step 914, the processing device trains by using the set of MLAs 250, the set of ML models 260 using the feature vector 612 and the actual prediction 642 made by the user 205 as a label. The processing device thus retrains and improves the set of ML models 260, which are output.

In one or more embodiments, the processing device may execute processing step 914 after a predetermined number of actual decisions made by the user 205 and respective feature vectors are stored in the database 230.

The method 900 ends.

In accordance with one or more embodiments, the present technology enables combining multiple statistical and machine learning algorithms for online learning applied to automatic policy capturing and decision support into an end-to-end solution, while integrating active learning methods for initial knowledge capture and a hybrid active-passive learning approach.

One or more embodiments of the present technology may be used in the defense and security domain, as a non-limiting example for inference tasks to support human experts in target identification or threat assessment of detected vessels/aircraft/submarines and other entities.

One or more embodiments of the present technology may be used in the medical domain, as a non-limiting example for an expert feedback system to support human decision making (e.g., choice to intubate or not a patient based on situation attributes), or in a recommendation and automation system (based on the captured expert policies) indicating in real time the ventilator parameter adjustments required for a patient based on ventilator and patient data used as input.

One or more embodiments of the present technology may be used in aviation and other transportation contexts: as a non-limiting example for training and recommendation system that learns expert behavior patterns (e.g., standard procedures given a particular situation) and then provides feedback to support human performance (during training or actual operations).

One or more embodiments of the present technology may be used as a decision (or behavior) recommendation (or forecasting) component of a virtual assistant for aircraft pilots (including single pilot operations) and other members of the flight crew (both in training simulations and real flights), either as personalized recommendation models for each individual, as group-of-experts models, as normative models based on organizational policies (or any mix of these three sources of data for policy capturing). In such embodiments, the virtual assistant may provide real or hypothetical inputs to the present technology and evaluate outputs in relation to contextual factors and/or a knowledge base prior to providing assistance to the flight crew.

One or more embodiments of the present technology may be used in various business domains involving recommendation systems such as wine or meal recommendation per user profile, real estate recommendations, movie recommendations, matchmaking recommendations, and/or other decision-making tasks in the legal, medical, education, financial and management fields.

It should be expressly understood that not all technical effects mentioned herein need to be enjoyed in each and every embodiment of the present technology. For example, embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

The invention claimed is:

1. A method for providing a recommendation for a given problem by using a set of machine learning models online, the given problem being associated with a set of features, the method being executed by a processing device, the method comprising:

initializing, using the set of features associated with the given problem, a set of supervised machine learning algorithms to obtain a set of machine learning models, each of the set of features comprising corresponding feature values;

associating each of the set of machine learning models with a running class-specific accuracy metric indicative of a performance in predicting a specific class, the running class-specific accuracy metric computed from prior predictions for the specific class comprising a determined eligibility and a determined contribution weight;

iteratively selecting during a knowledge capture phase a current feature vector to label while alternating between a passive learning approach and an active learning approach, the active learning approach using disagreement between at least two of the machine learning models to select a case, adding the current feature vector to a set of labeled feature vectors at each iteration until a suitable initialization condition is satisfied;

upon detection of the suitable initialization condition:

providing, by the set of supervised machine learning algorithms, the set of machine learning models for online learning;

obtaining a new feature vector for the given problem;

generating, by the set of machine learning models, using the new feature vector, a set of predictions, each respective prediction being associated with a respective accuracy metric;

providing, based on at least one of the set of predictions associated with the respective accuracy metrics, the recommendation for the given problem, the recommendation being associated with a first prediction having been generated by at least one of the set of machine learning models, the first prediction being generated based at least in part on the running class-specific accuracy metric corresponding to the specific class that was predicted;

generating a prediction label from the set of predictions by combining the set of predictions of a subset of the machine learning models based on a weighted vote, wherein each weight of the weighted vote is a function of the running class specific metric;

obtaining an actual decision associated with the new feature vector for the given problem to be output with at least one of the corresponding features values;

determining which of the corresponding feature values from the set of features was not identified to be output with the actual decision, and upon said determining, removing the corresponding feature values that were not identified to be output with the actual decision from the new feature vector; and training, by the set of supervised machine learning algorithms, the set of machine learning models using the new feature vector, the actual decision as a label, and the prediction label as a target.

2. The method of claim 1, wherein said initializing, using the set of features associated with the given problem, the set of supervised machine learning algorithms to obtain the set of machine learning models is performed offline.

3. The method of claim 2, further comprising, prior to said providing, based on the at least one of the set of predictions associated with the respective accuracy metrics, the recommendation for the given problem:

voting, by the set of machine learning models, for the first prediction by using the set of predictions with the respective accuracy metrics as a weight.

4. The method of claim 2, wherein said providing, based on the at least one of the set of predictions associated with the respective accuracy metrics, the recommendation for the given problem is in response to a first respective accuracy metric associated with the first respective prediction generated by a first machine learning model being above remaining respective accuracy metrics associated with the set of predictions.

5. The method of claim 4, wherein the feature vector is a first feature vector, the set of predictions is a set of first predictions, and the recommendation is a first recommendation; and wherein the method further comprises:

obtaining a second feature vector for the given problem;

generating, by the set of machine learning models, using the second feature vector, a set of second predictions, each respective second prediction being associated with a respective second accuracy metric; and providing, based on the respective second accuracy metrics, a second recommendation associated with a second respective prediction having been generated by a second machine learning model of the set of machine learning models.

6. The method of claim 1, wherein the running class-specific accuracy metric is determined based on a number of true positive (TP) past predictions and false positive (FP) past predictions.

7. The method of claim 1, wherein the actual decision is associated with a user interaction parameter indicative of behavior of a user in performing the actual decision; and wherein the method further comprises, prior to said training, by the set of supervised machine learning algorithms, the set of machine learning models:

determining at least one feature not having been used by the user for performing the actual decision; and wherein said training, by the set of supervised machine learning algorithms, the set of machine learning models is further based on the at least one feature.

8. The method of claim 1, wherein said initializing, using the set of features associated with the given problem, the set of machine learning algorithms comprises:

obtaining the set of features for the given problem, each feature being associated with a respective feature value range;

generating, using the set of features associated with the respective feature value ranges, a set of training feature vectors;

providing the set of training feature vectors for labeling thereof;

obtaining, for each training feature vector of the set of training feature vectors, a respective label; and training, by the set of supervised machine learning algorithms, the set of machine learning models using the set of training feature vectors with the respective labels as a different target, thereby resulting in another suitable initialization condition.

9. The method of claim 1, wherein said initializing, using the set of features associated with the given problem, the set of supervised machine learning algorithms comprises:

obtaining the set of features for the given problem;

obtaining a set of unlabeled feature vectors for the given problem;

generating, for each of the set of unlabeled feature vectors, by the set of machine learning models, a respective set of predictions;

providing, based on the respective set of predictions for each of the set of unlabeled feature vectors, a subset of the unlabeled feature vectors for annotation thereof;

obtaining, for each of the subset of the unlabeled feature vectors, a respective label so as to obtain a subset of labeled feature vectors; and training, by the set of supervised machine learning algorithms, the set of machine learning models using the subset of labeled feature vectors with the respective labels as a different target, thereby resulting in another suitable initialization condition.

10. The method of claim 9, further comprising, prior to said providing the subset of the unlabeled feature vectors for annotation thereof:

determining, for each of the set of unlabeled feature vectors, using the respective set of predictions, a respective disagreement score indicative of a difference in predictions of the set of machine learning models; and selecting, based on the respective disagreement score, from the set of unlabeled feature vectors, the single unlabeled feature vector to be part of the subset of the unlabeled feature vectors.

11. A method for generating a labeled training dataset for training a set of machine learning models for performing a prediction for a given problem, the method being executed by a processing device, the processing device being connected to a non-transitory storage medium comprising:

a plurality of unlabeled feature vectors for the given problem, each of the plurality of unlabeled feature vectors having respective values for a set of features, the method comprising:

initializing, by the set of supervised machine learning algorithms, using the set of features associated with the given problem, the set of machine learning models, each of the set of machine learning models having a different respective architecture, each of the set of features comprising corresponding feature values;

associating each of the set of machine learning models with a running class-specific accuracy metric indicative of a performance in predicting a specific class, the running class-specific accuracy metric computed from prior predictions for the specific class comprising a determined eligibility and a determined contribution weight;

obtaining, from the non-transitory storage medium comprising the plurality of unlabeled feature vectors, a first unlabeled feature vector for the given problem;

obtaining, for the first unlabeled feature vector, a first prediction label to thereby obtain a first labeled feature vector;

adding the first labeled feature vector associated with the first prediction label to the labeled training dataset;

obtaining, from the non-transitory storage medium comprising the plurality of unlabeled feature vectors, a set of unlabeled feature vectors;

generating, for each of the set of unlabeled feature vectors, using the set of machine learning models having been trained on the labeled training dataset comprising the first labeled feature vector associated with the first prediction label, a respective set of predictions, at least one of the respective set of predictions being generated based at least in part on the running class-specific accuracy metric corresponding to the specific class that was predicted;

determining, for each of the set of unlabeled feature vectors, using the respective set of predictions, a respective disagreement score indicative of a difference in predictions of the set of machine learning models;

selecting, based on the respective disagreement score, from the set of unlabeled feature vectors, a second unlabeled feature vector;

obtaining, for the second unlabeled feature vector, a second prediction label to thereby obtain a second labeled feature vector, the second prediction label generated from the set of predictions by combining the set of predictions of a subset of the machine learning models based on a weighted vote, wherein each weight of the weighted vote is a function of the running class specific metric; and adding the second labeled feature vector associated with the second prediction label to the labeled training dataset for retraining the set of machine learning models on the labeled training dataset comprising the first labeled feature vector and the second labeled feature vector.

12. A system for providing a recommendation for a given problem by using a set of machine learning models online, the given problem being associated with a set of features, the system comprising:

a processing device;

a non-transitory computer-readable storage medium operatively connected to the processing device, the non-transitory computer-readable storage medium comprising instructions;

the processing device, upon executing the instructions, being configured for:

initializing, using the set of features associated with the given problem, a set of supervised machine learning algorithms to obtain a set of machine learning models, each of the set of features comprising corresponding feature values;

associating each of the set of machine learning models with a running class-specific accuracy metric indicative of a performance in predicting a specific class, the running class-specific accuracy metric computed from prior predictions for the specific class comprising a determined eligibility and a determined contribution weight;

iteratively selecting during a knowledge capture phase a current feature vector to label while alternating between a passive learning approach and an active learning approach, the active learning approach using disagreement between at least two of the machine learning models to select a case, adding the current feature vector to a set of labeled feature vectors at each iteration until a suitable initialization condition is satisfied;

upon detection of the suitable initialization condition:

providing, by the set of supervised machine learning algorithms, the set of machine learning models for online learning;

obtaining a new feature vector for the given problem;

generating, by the set of machine learning models, using the new feature vector, a set of predictions, each respective prediction being associated with a respective accuracy metric;

providing, based on at least one of the set of predictions associated with the respective accuracy metrics, the recommendation for the given problem, the recommendation associated with a first prediction having been generated by at least one of the set of machine learning models, the first prediction being generated based at least in part on the running class-specific accuracy metric corresponding to the specific class that was predicted;

generating a prediction label from the set of predictions by combining the set of predictions of a subset of the machine learning models based on a weighted vote, wherein each weight of the weighted vote is a function of the running class specific metric;

obtaining an actual decision associated with the new feature vector for the given problem to be output with at least one of the corresponding features values;

determining which of the corresponding feature values from the set of features was not identified to be output with the actual decision, and upon said determining, removing the corresponding feature values that were not identified to be output with the actual decision from the new feature vector; and training, by the set of supervised machine learning algorithms, the set of machine learning models using the new feature vector, the actual decision as a label, and the prediction label as a target.

13. The system of claim 12, wherein said initializing, using the set of features associated with the given problem, the set of supervised machine learning algorithms to obtain the set of machine learning models is performed offline.

14. The system of claim 13, wherein the processing device is further configured for, prior to said providing, based on the at least one of the set of predictions associated with the respective accuracy metrics, the recommendation for the given problem:

voting, by the set of machine learning models, for the first prediction by using the set of predictions with the respective accuracy metrics as a weight.

15. The system of claim 13, wherein said providing, based on the at least one of the set of predictions associated with the respective accuracy metrics, the recommendation for the given problem is in response to a first respective accuracy metric associated with the first respective prediction generated by a first machine learning model being above remaining respective accuracy metrics associated with the set of predictions.

16. The system of claim 15, wherein the feature vector is a first feature vector, the set of predictions is a set of first predictions, and the recommendation is a first recommendation; and wherein the processing device is further configured for:

obtaining a second feature vector for the given problem;

generating, by the set of machine learning models, using the second feature vector, a set of second predictions, each respective second prediction being associated with a respective second accuracy metric; and providing, based on the respective second accuracy metrics, a second recommendation associated with a second respective prediction having been generated by a second machine learning model of the set of machine learning models.

17. The system of claim 12, wherein the actual decision is associated with a user interaction parameter indicative of behavior of a user in performing the actual decision; and wherein the processing device is further configured for, prior to said training, by the set of supervised machine learning algorithms, the set of machine learning models:

determining at least one feature not having been used by the user for performing the actual decision; and wherein said training, by the set of supervised machine learning algorithms, the set of machine learning models is further based on the at least one feature.

18. The system of claim 12, wherein said initializing, using the set of features associated with the given problem, the set of machine learning models comprises:

obtaining the set of features for the given problem, each feature being associated with a respective feature value range;

generating, using the set of features associated with the respective feature value ranges, a set of training feature vectors;

providing the set of training feature vectors for labeling thereof;

obtaining, for each training feature vector of the set of training feature vectors, a respective label; and training, by the set of supervised machine learning algorithms, the set of machine learning models using the set of training feature vectors with the respective labels as a different target, thereby resulting in another suitable initialization condition.

19. The system of claim 12, wherein the running class-specific accuracy metric is determined based on a number of true positive (TP) past predictions and false positive (FP) past predictions.

* * * * *